US012804158B2

(12) United States Patent
Dinh et al.

(10) Patent No.: US 12,804,158 B2
(45) Date of Patent: Nov. 17, 2026

(54) IMAGE ENCODING APPARATUS AND IMAGE DECODING APPARATUS BOTH BASED ON ARTIFICIAL INTELLIGENCE, AND IMAGE ENCODING METHOD AND IMAGE DECODING METHOD PERFORMED BY THE IMAGE ENCODING APPARATUS AND THE IMAGE DECODING APPARATUS

(71) Applicant: SAMSUNG ELECTRONICS CO., LTD., Suwon-si (KR)

(72) Inventors: Quockhanh Dinh, Suwon-si (KR); Hyungmin Roh, Suwon-si (KR); Minwoo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 18/237,150

(22) Filed: Aug. 23, 2023

(65) Prior Publication Data

US 2024/0073425 A1 Feb. 29, 2024

Related U.S. Application Data

(63) Continuation of application No. PCT/KR2023/012207, filed on Aug. 17, 2023.

(30) Foreign Application Priority Data

Aug. 23, 2022 (KR) ........................ 10-2022-0105805
Nov. 29, 2022 (KR) ........................ 10-2022-0163444

(51) Int. Cl.
*H04N 19/139* (2014.01)
*H04N 19/172* (2014.01)
(Continued)

(52) U.S. Cl.
CPC ......... *H04N 19/139* (2014.11); *H04N 19/172* (2014.11); *H04N 19/42* (2014.11); *H04N 19/52* (2014.11)

(58) Field of Classification Search
CPC .... H04N 19/139; H04N 19/172; H04N 19/42; H04N 19/52
(Continued)

(56) References Cited

U.S. PATENT DOCUMENTS 7,995,800 B2 8/2011 Lu
9,426,481 B2 8/2016 Kim et al.
(Continued)

FOREIGN PATENT DOCUMENTS

CN 112637604 A 4/2021
KR 10-1639335 B1 7/2016
(Continued)

OTHER PUBLICATIONS

Arnaudov, Pvel et al., "Dynamically Adaptive Fast Motion Estimation Algorithm for HD Video", Journal of Signal Processing Systems, Jun. 22, 2020. (17 pages total).
(Continued)

*Primary Examiner* — Joseph G Ustaris
*Assistant Examiner* — Jimmy S Lee
(74) *Attorney, Agent, or Firm* — Sughrue Mion, PLLC

(57) ABSTRACT

An image encoding method based on artificial intelligence (AI) includes obtaining motion vector feature data of a current frame by inputting the current frame and a reference frame to a motion vector encoder and applying a plurality of resolution scales to the current frame and the reference frame via the motion vector encoder; obtaining a current motion vector by inputting the motion vector feature data to a motion vector decoder; obtaining a current predicted image based on the current motion vector and the reference
(Continued)

frame; and generating a bitstream based on the motion vector feature data and the current predicted image.

15 Claims, 16 Drawing Sheets

(51) Int. Cl.
*H04N 19/42* (2014.01)
*H04N 19/52* (2014.01)

(58) Field of Classification Search
USPC ........................................................ 375/240.16
See application file for complete search history.

(56) References Cited

U.S. PATENT DOCUMENTS

| | | | | |
|---|---|---|---|---|
| 11,122,238 | B1 | 9/2021 | van Amersfoort et al. | |
| 11,695,935 | B2 | 7/2023 | Paluri et al. | |
| 2006/0008008 | A1 | 1/2006 | Song | |
| 2016/0014426 | A1* | 1/2016 | Richert | G06T 7/579 375/240.16 |
| 2018/0332300 | A1 | 11/2018 | Kim | |
| 2019/0246102 | A1 | 8/2019 | Cho et al. | |
| 2019/0261001 | A1* | 8/2019 | Holland | H04N 19/567 |
| 2019/0297326 | A1 | 9/2019 | Reda et al. | |
| 2020/0389658 | A1* | 12/2020 | Kim | H04N 19/132 |
| 2021/0012177 | A1 | 1/2021 | Yang et al. | |
| 2021/0084291 | A1* | 3/2021 | Chang | H04N 19/109 |
| 2021/0344918 | A1* | 11/2021 | Luo | H04L 65/70 |
| 2022/0020182 | A1 | 1/2022 | Jiang et al. | |
| 2022/0108466 | A1 | 4/2022 | Mendlovic et al. | |
| 2022/0122237 | A1* | 4/2022 | Yi | G06T 5/30 |
| 2022/0210402 | A1* | 6/2022 | Li | H04N 19/577 |
| 2022/0303568 | A1* | 9/2022 | Pourreza | H04N 19/137 |
| 2023/0196837 | A1* | 6/2023 | Li | H04N 19/513 382/156 |
| 2023/0291926 | A1* | 9/2023 | Kang | H04N 19/105 |
| 2023/0419082 | A1* | 12/2023 | Yuan | G06N 3/0464 |

FOREIGN PATENT DOCUMENTS

| | | | |
|---|---|---|---|
| KR | 10-2019-0096281 | A | 8/2019 |
| KR | 10-2022-0071973 | A | 5/2022 |
| WO | 2022/139616 | A1 | 6/2022 |
| WO | 2023/043154 | A1 | 3/2023 |

OTHER PUBLICATIONS

Luo, Wenjie et al., "Understanding the Effective Receptive Field in Deep Convolutional Neural Networks", 29th Conference on Neural Information Processing Systems (NIPS 2016), arXiv:1701.04128v2 [cs.cv], Jan. 25, 2017. (9 pages total).
Lu, Guo et al., "DVC: An End-to-end Deep Video Compression Framework", arXiv:1812.00101v3 [eess.IV], Apr. 7, 2019. (14 pages total).
Agustsson, Eirikur et al., Scale-space flow for end-to-end optimized video compression:, CVPR 2020, pp. 8503-8512.
Hu, Zhihao et al., "Coarse-to-fine Deep Video Coding with Hyperprior-guided Mode Prediction", arXiv:2206.07460v1 [cs.CV], Jun. 15, 2022. (13 pages total).
Seb, "What is Pooling in a Convolutional Neural Network (CNN): Pooling Layers Explained", Programmathically, Posted Dec. 5, 2021 in Computer Vision, Deep Learning, Machine Learning, https://prog cammathically.com/what-is-pooling-in-a-convolutional-neuralnetwork-cnn-pooling-laversexplained/#:~.t=Pooling%20in%20convolutional%20neural%20networks.their%201ocation%20in%20the%20ima. (7 pages total).
Du, Jinglong et al., "Brain MRI Super-Resolution Using 3D Dilated Convolutional Encoder-Decoder Network", IEEE Access, vol. 8, Jan. 30, 2020, pp. 18938-18950.
Mentzer, Fabian et al., "Neural Video Compression using GANs for Detail Synthesis and Propagation", arXiv:2107.12038v3 [eess.IV], Jul. 12, 2022. (28 pages total).
Lin, Haoning et al., "Maritime Semantic Labeling of Optical Remote Sensing Images with Multi-Scale Fully Convolutional Network", Remote Sensing, May 14, 2017, vol. 9, No. 480. (21 pages total).
Weng, Lilian, "From Autoencoder to Beta-VAE", Aug. 12, 2018, https:/lilianweng.github.io/posts/2018-08-12-vae/ (10 pages total).
Balle', Johannes et al., "Variational Image Compression With A Scale Hyperprior", Published a a conference paper at ICLR 2018, arXiv:1802.01436v2 [eess.IV], May 1, 2018. (23 pages total).
Guo Lu et al., "DVC: An End-to-end Deep Video Compression Framework", Dec. 31, 2018, 14 pages, arXiv:1812.00101v1 [eess.IV].
International Search Report and Written Opinion issued by the International Searching Authority on Nov. 20, 2023 for International Patent Application No. PCT/KR2023/012207 (PCT/ISA/220, PCT/ISA/210, and PCT/ISA/237).
Ren Yang et al., "OpenDVC: An Open Source Implementation of the DVC Video Compression Method", arXiv:2006.15862v2 [eess.IV], Jun. 29, 2020, 4 pages, https://doi.org/10.48550/arXiv.2006.15862.
Zhihao Hu et al., "Improving Deep Video Compressions by Resolution-Adaptive Flow Coding", Computer Vision—ECCV 2020: 16th European Conference, Glasgow, UK, Aug. 23-28, 2020, Proceedings, Part II, pp. 193-209, https://doi.org/10.1007/978-3-030-58536-5_1.
Z. Hu, G. Lu, J. Guo, S. Liu, W. Jiang and D. Xu, "Coarse-To-Fine Deep Video Coding with Hyperprior-Guided Mode Prediction," 2022 IEEE/CVF Conference on Computer Vision and Pattern Recognition (CVPR), New Orleans, LA, USA, 2022, pp. 5911-5920, doi: 10.1109/CVPR52688.2022.00583.
A. Ranjan and M. J. Black, "Optical Flow Estimation Using a Spatial Pyramid Network," 2017 IEEE Conference on Computer Vision and Pattern Recognition (CVPR), Honolulu, HI, USA, 2017, pp. 2720-2729, doi: 10.1109/CVPR.2017.291.
M. Zhai, X. Xiang, R. Zhang, N. Lv and A. El Saddik, "Learning Optical Flow Using Deep Dilated Residual Networks," in IEEE Access, vol. 7, pp. 22566-22578, 2019, doi: 10.1109/ACCESS.2019.2898988.
Bo Yang et al., "Unsupervised Optical Flow Estimation Based on Improved Feature Pyramids", Neural Process Lett 52, pp. 1601-1612, Aug. 5, 2020, https://doi.org/10.1007/s11063-020-10328-2.
Extended European Search Report issued Sep. 22, 2025 by the European Patent Office for EP Patent Application No. 23857651.6.

* cited by examiner

IMAGE ENCODING APPARATUS AND IMAGE DECODING APPARATUS BOTH BASED ON ARTIFICIAL INTELLIGENCE, AND IMAGE ENCODING METHOD AND IMAGE DECODING METHOD PERFORMED BY THE IMAGE ENCODING APPARATUS AND THE IMAGE DECODING APPARATUS

CROSS-REFERENCE TO RELATED APPLICATION

This application is a bypass continuation application of International Patent Application No. PCT/KR2023/012207 filed on Aug. 17, 2023, which claims priority from Korean Patent Application No. 10-2022-0105805, filed on Aug. 23, 2022, and Korean Patent Application No. 10-2022-0163444, filed on Nov. 29, 2022, in the Korean Intellectual Property Office, the disclosures of which are incorporated herein by reference in their entireties.

TECHNICAL FIELD

The disclosure relates to image encoding and decoding. More particularly, the disclosure relates to a technology for encoding and decoding an image by using artificial intelligence (AI), for example, a neural network.

BACKGROUND ART

Codecs such as H.264 advanced video coding (AVC) and high efficiency video coding (HEVC) may divide an image into blocks and predictively encode and decode each block through inter prediction or intra prediction.

Intra prediction is a method of compressing an image by removing spatial redundancy in the image, and inter prediction is a method of compressing an image by removing temporal redundancy between images.

A representative example of inter prediction is motion estimation coding. Motion estimation coding predicts blocks of a current image by using a reference image. A reference block that is most similar to a current block may be found in a predetermined search range by using a predetermined evaluation function. The current block is predicted based on the reference block, and a prediction block generated as a result of prediction is subtracted from the current block to generate a residual block. The residual block is then encoded.

To derive a motion vector indicating the reference block in the reference image, a motion vector of previously encoded blocks may be used as a motion vector predictor of the current block. A differential motion vector corresponding to a difference between a motion vector of the current block and the motion vector predictor of the current block is signaled to a decoder side through a predetermined method.

Recently, techniques for encoding/decoding an image by using artificial intelligence (AI) have been proposed, and a method for effectively encoding/decoding an image using AI, for example, a neural network, is required.

DESCRIPTION OF EMBODIMENTS

An image encoding method based on artificial intelligence (AI) according to an embodiment of the disclosure may include obtaining motion vector feature data of a current frame by inputting the current frame and a reference frame to a motion vector encoder and applying a plurality of resolution scales to the current frame and the reference frame via the motion vector encoder; obtaining a current motion vector by inputting the motion vector feature data to a motion vector decoder; obtaining a current predicted image based on the current motion vector and the reference frame; and generating a bitstream based on the motion vector feature data and the current predicted image.

An image encoding apparatus based on AI according to an embodiment of the disclosure may include a prediction encoder, a prediction decoder, and a generator. The prediction encoder may be configured to obtain motion vector feature data of a current frame by inputting the current frame and a reference frame to a motion vector encoder and applying a plurality of resolution scales to the current frame and the reference frame via the motion vector encoder. The prediction decoder may be configured to obtain a current motion vector by inputting the motion vector feature data to a motion vector decoder. The prediction decoder may be configured to obtain a current predicted image based on the current motion vector and the reference frame. The generator may be configured to generate a bitstream based on the motion vector feature data and the current predicted image.

An image decoding method based on AI according to an embodiment of the disclosure may include obtaining motion vector feature data of a current frame of a plurality of resolutions from a bitstream; obtaining a current motion vector by applying the motion vector feature data to a motion vector decoder; and obtaining a current predicted image by using the current motion vector and a reference frame. The plurality of resolutions may include an original resolution of the current frame and a resolution downscaled from the original resolution of the current frame.

An image decoding apparatus based on AI according to an embodiment of the disclosure may include an obtainer and a prediction decoder. The obtainer may be configured to obtain motion vector feature data of a current frame of a plurality of resolutions from a bitstream. The prediction decoder may be configured to obtain a current motion vector by applying the motion vector feature data to a motion vector decoder. The prediction decoder may be configured to obtain a current predicted image by using the current motion vector and a reference frame.

DETAILED DESCRIPTION

Figure 1:
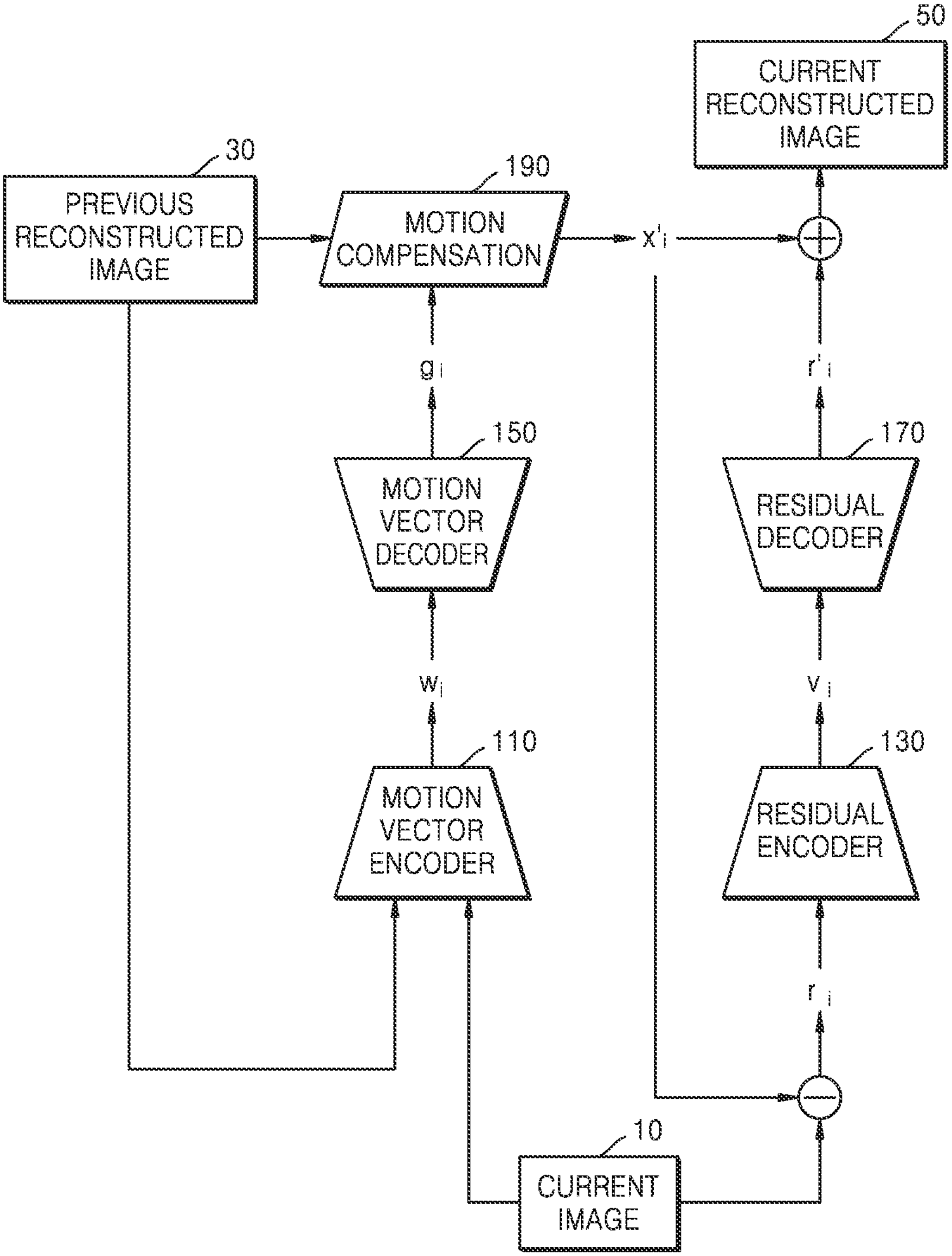
FIG. 1 is a diagram illustrating an image encoding and decoding process based on artificial intelligence (AI), according to an embodiment of the disclosure.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

Throughout the disclosure, the expression "at least one of a, b or c" indicates only a, only b, only c, both a and b, both a and c, both b and c, all of a, b, and c, or variations thereof.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion (unit)" or a "module" as used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' as used herein may indicate a still image, a picture, a frame, a moving picture composed of a plurality of continuous still images, or a video.

A 'neural network' as used herein is a representative example of an artificial neural network model that mimics a brain nerve, and is not limited to an artificial neural network model using a specific algorithm. The neural network may also be referred to as a deep neural network.

A 'parameter' as used herein, which is a value used in a computation process of each layer included in a neural network, may be used, for example, when an input value is applied to a predetermined computational formula. The parameter, which is a value set as a result of training, may be updated through separate training data according to need.

'Feature data' as used herein refers to data obtained by processing input data by a neural-network-based encoder. The feature data may be one- or two-dimensional (1D or 2D) data including a plurality of samples. The feature data may also be referred to as latent representation. The feature data may represent latent features of data output by a decoder described below.

A 'current image' as used herein refers to an image to be currently processed, and a 'previous image' as used herein refers to an image to be processed before the current image. A 'current motion vector' refers to a motion vector obtained to process the current image.

A 'sample' as used herein, which is data assigned to a sampling location in an image, a feature map, or feature data, refers to data that is to be processed. For example, the sample may pixels in a 2D image.

FIG. 1 is a diagram illustrating an image encoding and decoding process based on artificial intelligence (AI), according to an embodiment of the disclosure.

Referring to FIG. 1, a motion vector encoder 110, a residual encoder 130, a motion vector decoder 150, and a residual decoder 170 may be used in AI-based inter prediction.

The motion vector encoder 110, the residual encoder 130, the motion vector decoder 150, and the residual decoder 170 may be implemented as neural networks.

The motion vector encoder 110 and the motion vector decoder 150 may be understood as neural networks for extracting motion vector feature data $w_i$ of a current image (e.g., a current frame) 10 of a plurality of resolutions from the current image 10 and a previous reconstructed image (e.g., a reference frame) 30 and extracting a current motion vector $g_i$ from the motion vector feature data $w_i$. The current frame and the reference frame may be the parts of a same video sequence.

The residual encoder 130 and the residual decoder 170 may be neural networks for extracting feature data of a received residual image n and reconstructing an image from the feature data.

Inter prediction is a process of encoding and decoding the current image 10 by using temporal redundancy between the current image 10 and the previous reconstructed image 30.

Position differences (or motion vectors) between blocks or samples in the current image 10 and reference blocks or reference samples in the previous reconstructed image 30 are used to encode and decode the current image 10. These position differences may also be referred to as an optical flow.

The optical flow, in particular, a current optical flow, may represent how positions of samples in the previous reconstructed image 30 have been changed in the current image 10, or where samples that are the same as or similar to the samples of the current image 10 are located in the previous reconstructed image 30.

For example, when a sample that is the same as or the most similar to a sample located at (1, 1) in the current image 10 is located at (2, 1) in the previous reconstructed image 30, an optical flow or motion vector of the sample may be derived as (1(=2−1), 0(=1−1)).

In the image encoding and decoding process using AI, the motion vector encoder 110 and the motion vector decoder 150 may be used to obtain a current optical flow $g_i$ of the current image 10.

In detail, the previous reconstructed image 30 and the current image 10 may be input to the motion vector encoder 110. The motion vector encoder 110 may output the motion vector feature data $w_i$ of the current image 10 of a plurality of resolutions by processing the current image 10 and the previous reconstructed image 30 according to parameters set as a result of training.

The motion vector feature data $w_i$ may be input to the motion vector decoder 150. The motion vector decoder 150 may output a current motion vector $g_i$ by processing the motion vector feature data $w_i$ according to the parameters set as a result of training.

Motion compensation 190 based on the current motion vector $g_i$ may be performed on the previous reconstructed image 30, and a current predicted image $x'_i$ may be obtained as a result of the motion compensation 190.

The motion compensation 190 is a process in which a current predicted image of the current image 10 is obtained using a pixel indicated by a motion vector in the previous reconstructed image 30.

The current predicted image x'i similar to the current image 10 may be obtained by applying the motion compensation 190 (or warping) to the previous reconstructed image 30 according to the current motion vector $g_i$ representing relative position relationships between the samples in the previous reconstructed image 30 and the samples in the current image 10.

For example, when a sample located at (1, 1) in the previous reconstructed image 30 is the most similar to a sample located at (2, 1) in the current image 10, the position of the sample located at (1, 1) in the previous reconstructed image 30 may be changed to (2, 1) through the motion compensation 190.

Because the current predicted image $x'_i$ generated from the previous reconstructed image 30 is not the current image 10 itself, a residual image n corresponding to a difference between the current predicted image $x'_i$ and the current image 10 may be obtained. For example, the residual image n may be obtained by subtracting sample values in the current predicted image $x'_i$ from sample values in the current image 10.

The residual image n may be input to the residual encoder 130. The residual encoder 130 may output feature data $v_i$ of the residual image n by processing the residual image n according to the parameters set as a result of training.

The feature data $v_i$ of the residual image n may be input to the residual decoder 170. The residual decoder 170 may output a reconstructed residual image $r'_i$ by processing the input feature data $v_i$ according to the parameters set as a result of training.

A current reconstructed image 50 may be obtained by combining the current predicted image $x'_i$ generated by the motion compensation 190 with respect to the previous reconstructed image 30 with the reconstructed residual image data $r'_i$.

When the image encoding and decoding process shown in FIG. 1 is implemented by an encoding apparatus and a decoding apparatus, the encoding apparatus may quantize the motion vector feature data $w_i$ and the feature data $v_i$ of the residual image n both obtained through the encoding of the current image 10, generate a bitstream including quantized feature data, and transmit the generated bitstream to the decoding apparatus. The decoding apparatus may obtain the motion vector feature data $w_i$ and the feature data $v_i$ of the residual image n by inversely quantizing the quantized feature data extracted from the bitstream. The decoding apparatus may obtain the current reconstructed image 50 by processing the motion vector feature data $w_i$ and the feature data $v_i$ of the residual image n by using the motion vector decoder 150 and the residual decoder 170.

Figure 2:
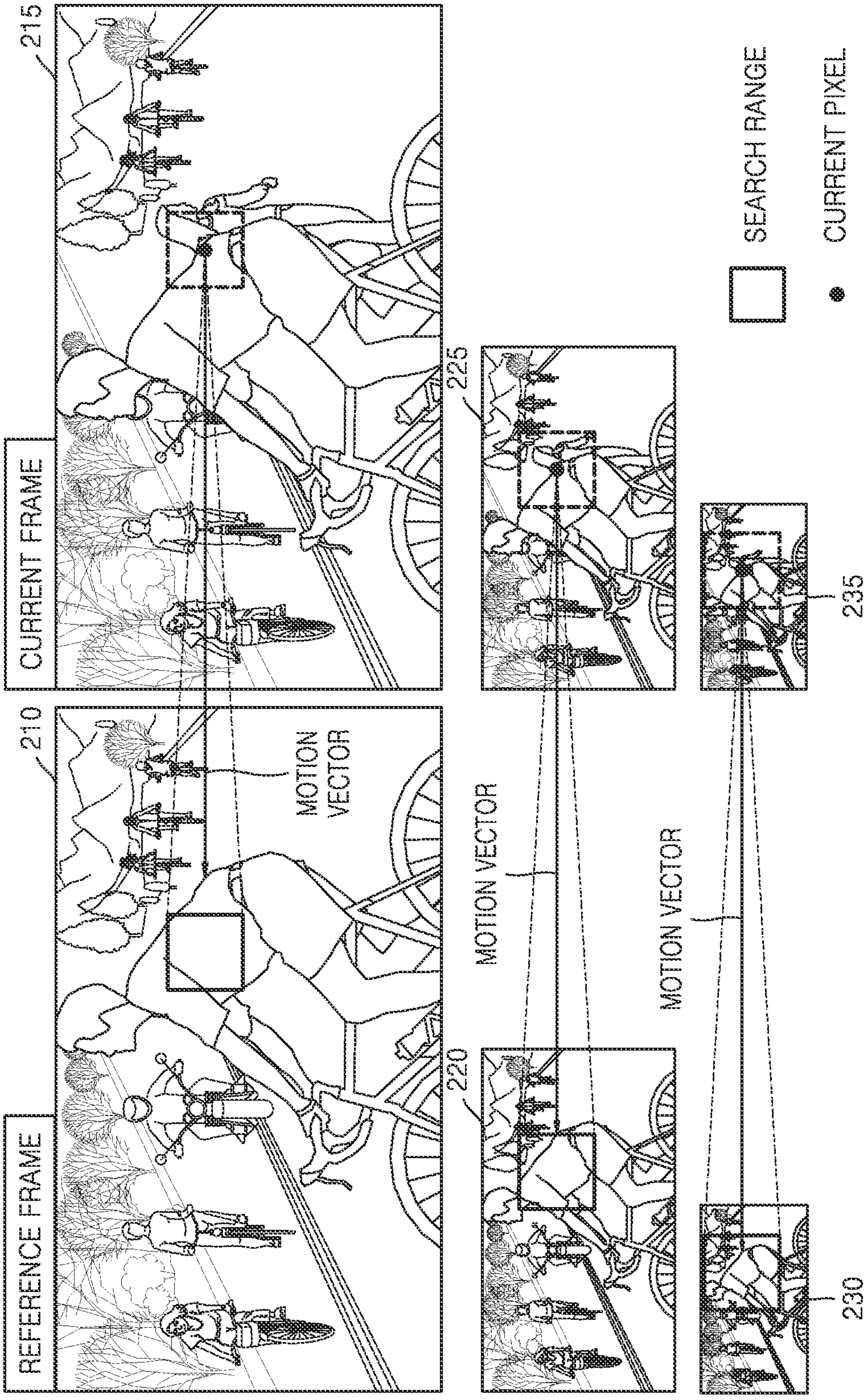
FIG. 2 is a view for explaining a motion search range according to the resolution of an image.

FIG. 2 is a view for explaining a motion search range according to the resolution of an image.

Motion estimation is performed by comparing the pixels of a reference frame with the pixels of a current frame. The searchable size of a motion vector is determined by the motion search range. When the motion search range is small, small motion vectors may be accurately estimated, and, when the motion search range is large, both large motion vectors and small motion vectors may be accurately estimated. To improve the coding performance of a large motion sequence, a large motion search range is needed.

In a limited motion search range, the smaller the resolution is, the more suitable the resolution is for motion search of a large motion vector.

Referring to FIG. 2, when the motion vector of a current pixel is large, a position indicated by a motion vector of a current frame 215 of the original resolution corresponding to a high resolution with respect to a reference frame 210 is not within the limited motion search range, and thus the motion search is not suitable. In other words, a large movement of the current pixel may be not covered, in the original resolution.

In the case of a motion vector of a current frame 225 with a resolution downscaled by ½ with respect to a reference frame 220, a position indicated by the motion vector may be located within the limited motion search range, and may be located at the boundary of the limited motion search range and thus may not be suitable for motion search. In other words, a large movement of the current pixel may be barely covered, in the resolution downscaled by ½.

In the case of a motion vector of a current frame 235 with a resolution downscaled by ¼ with respect to a reference frame 230, a position indicated by the motion vector may be located within the limited motion search range and thus may be suitable for motion search. In other words, a large movement of the current pixel may be fully covered, in the resolution downscaled by ¼.

Figure 3:
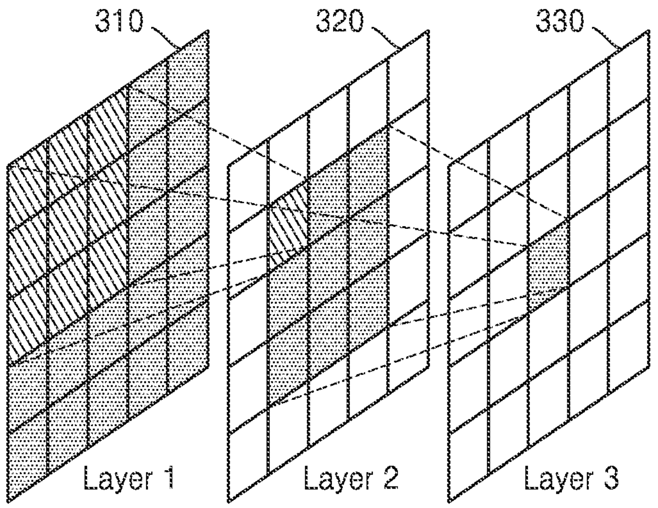
FIG. 3 is a diagram for explaining a receptive field of a neural network according to a convolution operation.

FIG. 3 is a diagram for explaining a receptive field of a neural network according to a convolution operation.

Referring to FIG. 3, when a convolution operation is performed by applying a 3×3 filter kernel to a first layer 310 of 5×5 sample data, 3×3 sample data is obtained as a portion of a second layer 320 corresponding to the 5×5 sample data. When a convolution operation is performed by applying a 3×3 filter kernel to the 3×3 sample data corresponding to the 5×5 sample data in the first layer 310 among sample data of the second layer 330, final sample data of 1×1 is obtained from a final layer 330. Because the sample data of the first layer 310 used to obtain the final sample data of 1×1 is 5×5 sample data, the receptive field of the neural network is 5×5. In other words, the range of input pixels contributing to a final output pixel is a receptive field.

For example, when there are 5 layers before a final layer and the filter kernel is 3×3, the receptive field is 11×11. When there are 10 layers before the final layer and the filter kernel is 3×3, the receptive field is 21×21. When there are 20 layers before the final layer and the filter kernel is 3×3, the receptive field is 41×41. When there are 40 layers before the final layer and the filter kernel is 3×3, the receptive field is 81×81.

Not every input pixel in the receptive field makes a significant contribution to the final output pixel. Input pixels in a central portion of the receptive field may contribute significantly to the final output pixel, and input pixels in a border portion of the receptive field may contribute modestly to the final output pixel. Thus, an effective receptive field may be smaller than the receptive field.

A convolutional neural network is provided with a small motion search range for motion estimation. Therefore, as shown in FIG. 2, motion estimation may be performed on a large motion vector within an appropriate motion search range by performing motion estimation in a resolution obtained by downscaling the resolution of an image.

Through a neural network structure capable of obtaining feature data of original resolution and a resolution downscaled from the original resolution, the effective receptive field may be extended, and thus both large and small motion vectors may be covered in the limited motion search range.

An example of a neural network structure of a motion vector decoder and a motion vector encoder that obtain motion vector feature data for a plurality of resolutions and obtain a current motion vector by using the motion vector feature data will now be described with reference to FIGS. 4 through 9.

Figure 4:
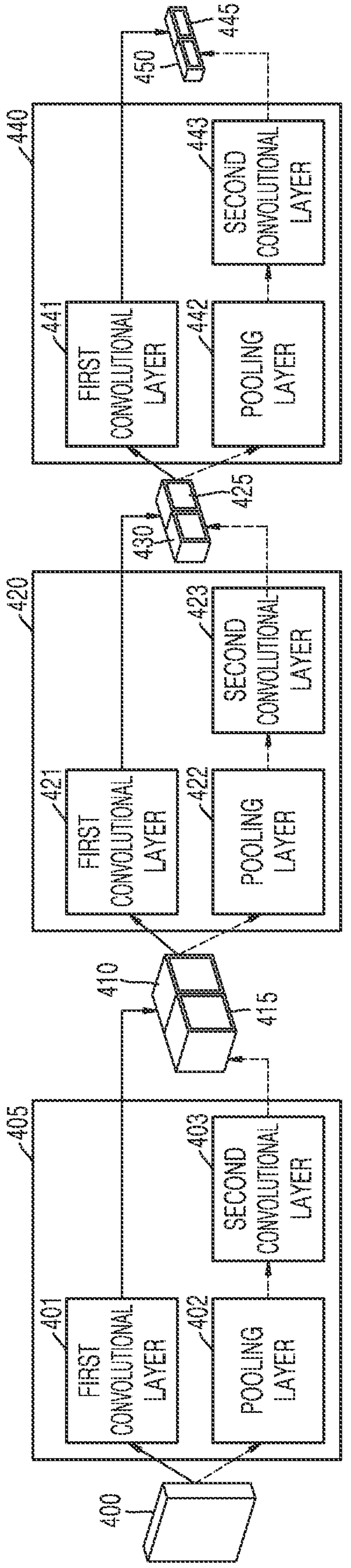
FIG. 4 is a block diagram of a neural network structure of a motion vector encoder according to an embodiment of the disclosure.

FIG. 4 is a block diagram of a neural network structure of a motion vector encoder according to an embodiment of the disclosure.

Referring to FIG. 4, the motion vector encoder 110 may include a plurality of neural network layers, namely, first, second, and third neural network layers 405, 420, and 440. In detail, all pixel data of an input image 400 obtained by concatenating a current image (e.g., a current frame) with a previous reconstructed image (e.g., a previous frame or a reference frame) is input to each of a first convolutional layer 401 and a pooling layer 402 in the first neural network layer 405 in the motion vector encoder 110. A first feature map 410 is obtained from the first convolutional layer 401 in the first neural network layer 405, and a second feature map 415 is obtained from the pooling layer 402 and a second convolutional layer 403 in the first neural network layer 405.

The first convolutional layer 401 may be a convolutional layer with a stride of N, the pooling layer 402 may be a pooling layer that reduces the size of a feature map by M, and the second convolutional layer 403 may be a convolutional layer with a stride of L, where L may be N/M. Because a pooling layer reduces the size of input data, the second feature map 415 output through the pooling layer 402 and the second convolutional layer 403 may be a feature map for a resolution obtained by downscaling the original resolution of an input image by 1/M.

How "pooling" is performed will be described below with reference to FIG. 10.

For example, when N is 2 and M is 2, L may be 1. In this case, a first feature map may be a feature map for the original resolution of the input image, and a second feature map may be a feature map for a resolution obtained by downscaling the original resolution of the input image by ½.

The number of channels of the first feature map 410 and the number of channels of the second feature map 415 do not need to be the same as each other.

The first feature map 410 and the second feature map 415 are concatenated and then the entire concatenated feature map data (the first feature map 410 and the second feature map 415) is input to each of a first convolutional layer 421 and a pooling layer 422 in the second neural network layer 420. A third feature map 425 is obtained from the first convolutional layer 421 in the second neural network layer 420, and a fourth feature map 430 is obtained from the pooling layer 422 and a second convolutional layer 423 in the second neural network layer 420.

The second neural network layer 420 may be the same as the first neural network layer 405. The first convolutional layer 421 may be a convolutional layer with a stride of N, the pooling layer 422 may be a pooling layer that reduces the size of a feature map by M, and the second convolutional layer 423 may be a convolutional layer with a stride of L, where L may be N/M. When N is 2 and M is 2 and thus L is 1, the third feature map 425 may be a feature map for the original resolution of the input image and the resolution obtained by downscaling the original resolution of the input image by ½, and the fourth feature map 430 may be a feature map for the resolution obtained by downscaling the original resolution of the input image by ½ and a resolution obtained by downscaling the original resolution of the input image by ¼.

The number of channels of the third feature map 425 and the number of channels of the fourth feature map 430 do not need to be the same as each other.

The third feature map 425 and the fourth feature map 430 are concatenated and then the entire concatenated feature map data (the third feature map 425 and the fourth feature map 430) is input to each of a first convolutional layer 441 and a pooling layer 442 in the third neural network layer 440. A fifth feature map 450 is obtained from the first convolutional layer 441 in the third neural network layer 440, and a sixth feature map 450 is obtained from the pooling layer 442 and a second convolutional layer 423 in the third neural network layer 440.

The third neural network layer 440 may be the same as the first neural network layer 405. The first convolutional layer 441 may be a convolutional layer with a stride of N, the pooling layer 442 may be a pooling layer that reduces the size of a feature map by M, and the second convolutional layer 443 may be a convolutional layer with a stride of L, where L may be N/M. When N is 2 and M is 2 and thus L is 1, the fifth feature map 445 may be a feature map for the original resolution of the input image, the resolution obtained by downscaling the original resolution of the input image by ½, and the resolution obtained by downscaling the original resolution of the input image by ¼, and the sixth feature map 450 may be a feature map for the resolution obtained by downscaling the original resolution of the input image by ½, the resolution obtained by downscaling the original resolution of the input image by ¼, and a resolution obtained by downscaling the original resolution of the input image by ⅛.

Because the effective receptive field is very large in the case of the feature map for the resolution obtained by downscaling the original resolution of the input image by ⅛, as compared to a feature map for a relatively large scale resolution, the case of the feature map for the resolution obtained by downscaling the original resolution of the input image by ⅛ may be effective in estimating a large motion vector. Because only feature maps for the same resolution are obtained in a general neural network structure, the effective receptive field is limited, whereas, in the motion vector encoder of FIG. 4, the effective receptive field is extended for layers that output a feature map with a downscaled resolution, due to execution of pooling before a convolution operation is performed.

The number of channels of the fifth feature map 445 and the number of channels of the sixth feature map 450 do not need to be the same as each other.

Motion vector feature data of a current image of a plurality of resolutions is obtained using the fifth feature map 445 and the sixth feature map 450.

The motion vector encoder includes at least one layer that downscales a feature map.

Because an output from each of the layers of the motion vector encoder is a mixture of feature maps of the plurality of resolutions, final output data from the motion vector encoder is the motion vector feature data of the current image of the image of the plurality of resolutions is compressed in the size of the feature map through the motion vector encoder to thereby reduce a bit rate.

Figure 5:
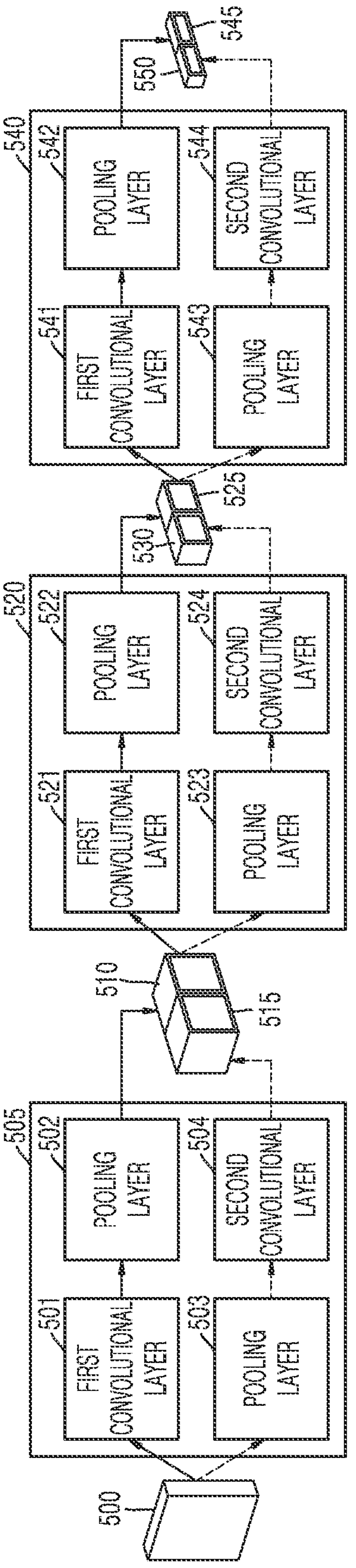
FIG. 5 is a block diagram of a neural network structure of a motion vector encoder according to an embodiment of the disclosure.

FIG. 5 is a block diagram of a neural network structure of a motion vector encoder according to an embodiment of the disclosure.

Referring to FIG. 5, the motion vector encoder 110 may include a plurality of neural network layers, namely, first, second, and third neural network layers 505, 520, and 540. In detail, all pixel data of an input image 500 obtained by concatenating a current image with a previous reconstructed image is input to each of a first convolutional layer 501 and a pooling layer 503 in the first neural network layer 505 in the motion vector encoder 110. A first feature map 510 is obtained from the first convolutional layer 501 and a pooling layer 502 in the first neural network layer 505, and a second feature map 515 is obtained from the pooling layer 503 and a second convolutional layer 504 in the first neural network layer 505.

The first convolutional layer 501 and the second convolutional layer 504 may be convolutional layers with a stride of N, and the pooling layer 502 and the pooling layer 503 may be pooling layers that reduce the size of a feature map by M. Because the pooling layer 503 reduces the size of input data, the second feature map 515 output through the pooling layer 503 and the second convolutional layer 504 may be a feature map for a resolution obtained by downscaling the original resolution of an input image by 1/M. Because the first feature map 510 output through the first convolutional layer 501 and the pooling layer 502 is only a result of first obtaining an intermediate feature map through the first convolutional layer 501 and then reducing the size of the intermediate feature map, the first feature map 510 may be a feature map for the original resolution of the input image.

For example, when N is 1 and M is 2, a first feature map may be a feature map for the original resolution of the input image, and a second feature map may be a feature map for a resolution obtained by downscaling the original resolution of the input image by ½.

The number of channels of the first feature map 510 and the number of channels of the second feature map 515 do not need to be the same as each other.

The first feature map 510 and the second feature map 515 are concatenated and then the entire concatenated feature map data (the first feature map 510 and the second feature map 515) is input to each of a first convolutional layer 521 and a pooling layer 523 the second neural network layer 520. A third feature map 525 is obtained from the first convolutional layer 521 and a pooling layer 522 in the second neural network layer 520, and a fourth feature map 530 is obtained from the pooling layer 523 and a second convolutional layer 524 in the second neural network layer 520.

The second neural network layer 520 may be the same as the first neural network layer 505. When N is 1 and M is 2, the third feature map 525 may be a feature map for the original resolution of the input image and the resolution obtained by downscaling the original resolution of the input image by ½, and the fourth feature map 530 may be a feature map for the resolution obtained by downscaling the original resolution of the input image by ½ and the resolution obtained by downscaling the original resolution of the input image by ¼.

The number of channels of the third feature map 525 and the number of channels of the fourth feature map 530 do not need to be the same as each other.

The third feature map 525 and the fourth feature map 530 are concatenated and then the entire concatenated feature map data (the third feature map 525 and the fourth feature map 530) is input to each of a first convolutional layer 541 and a pooling layer 543 the third neural network layer 540. A fifth feature map 545 is obtained from the first convolutional layer 541 and a pooling layer 522 in the third neural network layer 540, and a sixth feature map 450 is obtained from the pooling layer 543 and a second convolutional layer 524 in the third neural network layer 440.

The third neural network layer 540 may be the same as the first neural network layer 505. When N is 1 and M is 2, the fifth feature map 545 may be a feature map for the original resolution of the input image, the resolution obtained by downscaling the original resolution of the input image by ½, and the resolution obtained by downscaling the original resolution of the input image by ¼, and the sixth feature map 550 may be a feature map for the resolution obtained by downscaling the original resolution of the input image by ½, the resolution obtained by downscaling the original resolution of the input image by ¼, and the resolution obtained by downscaling the original resolution of the input image by ⅛.

Because the effective receptive field is very large in the case of the feature map for the resolution obtained by downscaling the original resolution of the input image by ⅛, as compared to a feature map for a relatively large scale resolution, the case of the feature map for the resolution obtained by downscaling the original resolution of the input image by ⅛ may be effective in estimating a large motion vector. Because only feature maps for the same resolution are obtained in a general neural network structure, the effective receptive field is limited, whereas, in the motion vector encoder of FIG. 5, the effective receptive field is extended for layers that output a feature map with a downscaled resolution, due to execution of pooling before a convolution operation is performed.

The number of channels of the fifth feature map 545 and the number of channels of the sixth feature map 550 do not need to be the same as each other.

Motion vector feature data of a current image of a plurality of resolutions is obtained using the fifth feature map 545 and the sixth feature map 550.

When a stride of the first convolutional layer 501 is N1, a stride of the second convolutional layer 504 is N2, a downscaling ratio of the pooling layer 502 is M1, and a downscaling ratio of the pooling layer 503 is M2, the neural network structure of the motion vector encoder may be determined under the condition of N1*M1=N2*M2.

When a stride of the first convolutional layer 521 is N3, a stride of the second convolutional layer 524 is N4, a downscaling ratio of the pooling layer 522 is M3, and a downscaling ratio of the pooling layer 523 is M4, the neural network structure of the motion vector encoder may be determined under the condition of N3*M3=N4*M4.

When a stride of the first convolutional layer 541 is N5, a stride of the second convolutional layer 544 is N6, a downscaling ratio of the pooling layer 542 is M5, and a downscaling ratio of the pooling layer 543 is M6, the neural network structure of the motion vector encoder may be determined under the condition of N5*M5=N6*M6. The motion vector encoder includes at least one layer that downscales a feature map.

Because an output from each of the layers of the motion vector encoder is a mixture of feature maps of the plurality of resolutions, final output data from the motion vector encoder is the motion vector feature data of the current image of the image of the plurality of resolutions is compressed in the size of the feature map through the motion vector encoder to thereby reduce a bit rate.

Figure 6:
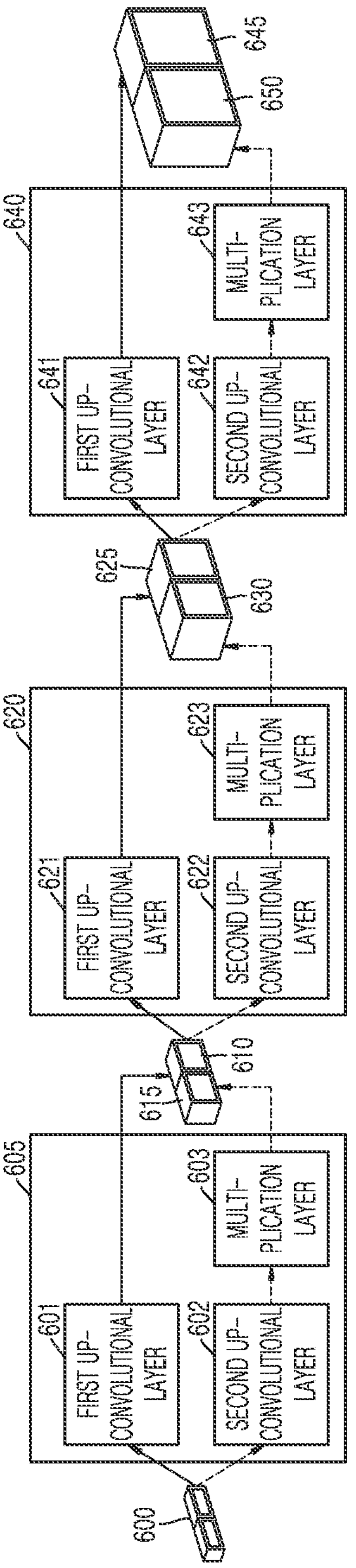
FIG. 6 is a block diagram of a neural network structure of a motion vector decoder according to an embodiment of the disclosure.

FIG. 6 is a block diagram of a neural network structure of a motion vector decoder according to an embodiment of the disclosure.

Referring to FIG. 6, the motion vector decoder 150 may include a plurality of neural network layers, namely, first, second, and third neural network layers 605, 620, and 640. In detail, motion vector feature data 600 for the current image 10 of a plurality of resolutions is input to each of a first up-convolutional layer 601 and a second up-convolutional layer 602 in the first neural network layer 605 in the motion vector decoder 150. A first feature map 610 is obtained from the first up-convolutional layer 601 in the first neural network layer 605, and a second feature map 615 is obtained from the second up-convolutional layer 602 and a multiplication layer 603 in the first neural network layer 605.

The first up-convolutional layer 601 and the second up-convolutional layer 602 are convolutional layers that perform both upsampling and convolution. An up-convolutional layer may be also referred to as a transposed convolutional layer. An upsampling ratio is a size corresponding to a downscaling ratio of the motion vector encoder 110. Up-convolution may be, for example, an operation in which deconvolution, a convolution operation, and pixel shuffle are performed together. The multiplication layer 603 multiplies input by a size corresponding to the downscaling ratio of the motion vector encoder 110.

A first feature map 610 and a second feature map 615 are concatenated and then the entire concatenated feature map data (the first feature map 610 and a second feature map 615) is input to each of a first up-convolutional layer 621 and a second up-convolutional layer 622 in the second neural network layer 620. A third feature map 625 is obtained from the first up-convolutional layer 621 in the second neural network layer 620, and a fourth feature map 630 is obtained from the second up-convolutional layer 622 and a multiplication layer 603 in the second neural network layer 620.

The third feature map 625 and the fourth feature map 630 are concatenated and then the entire concatenated feature map data (the third feature map 625 and the fourth feature map 630) is input to each of a first up-convolutional layer 641 and a second up-convolutional layer 642 in the third neural network layer 640. A fifth feature map 645 is obtained from the first up-convolutional layer 641 in the third neural network layer 640, and a sixth feature map 650 is obtained from the second up-convolutional layer 642 and a multiplication layer 643 in the third neural network layer 640.

A current motion vector is obtained using the fifth feature map 645 and the sixth feature map 650.

When the downscaling ratio in the motion vector encoder is N, the neural network structure of the motion vector decoder may be determined under the condition that strides of the first up-convolutional layer 601 and the second up-convolutional layer 602 are N, and the multiplication layer 603 is multiplied by N.

When the downscaling ratio in the motion vector encoder is N, the neural network structure of the motion vector decoder may be determined under the condition that strides of the first up-convolutional layer 621 and the second up-convolutional layer 622 are N, and the multiplication layer 623 is multiplied by N.

When the downscaling ratio in the motion vector encoder is N, the neural network structure of the motion vector decoder may be determined under the condition that strides of the first up-convolutional layer 641 and the second up-convolutional layer 642 are N, and the multiplication layer 643 is multiplied by N.

The neural network structure of the motion vector decoder of FIG. 6 corresponds to the neural network structure of the motion vector encoder described above with reference to FIG. 4 or 5, and outputs a current motion vector by receiving small-sized feature data output by the motion vector encoder and restoring compressed data. Because the output current motion vector is a result of reflection of motion estimation at a plurality of resolutions, an image may be accurately restored even when the size of the original motion vector is large as well as when the size of the original motion vector is small.

Figure 7:
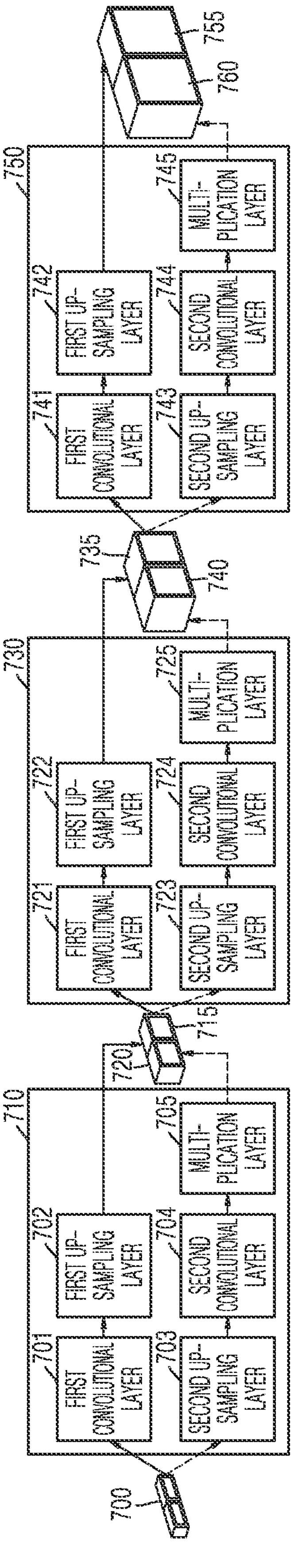
FIG. 7 is a block diagram of a neural network structure of a motion vector decoder according to an embodiment of the disclosure.

FIG. 7 is a block diagram of a neural network structure of a motion vector decoder according to an embodiment of the disclosure.

Referring to FIG. 7, the motion vector decoder 150 may include a plurality of neural network layers, namely, first, second, and third neural network layers 710, 730, and 750. In detail, motion vector feature data 700 for the current image 10 of a plurality of resolutions is input to each of a first convolutional layer 701 and a second up-sampling layer 703 in the first neural network layer 710 in the motion vector decoder 150. A first feature map 715 is obtained from the first convolutional layer 701 and a first up-sampling layer 702 in the first neural network layer 710, and a second feature map 615 is obtained from the second up-sampling layer 703, a second convolutional layer 704, and a multiplication layer 705 in the first neural network layer 710.

The first up-sampling layer 702 and the second up-sampling layer 703 are layers that perform upsampling. An upsampling ratio is a size corresponding to a downscaling ratio of the motion vector encoder 110.

The multiplication layer 705 multiplies input by a size corresponding to the downscaling ratio of the motion vector encoder 110.

A first feature map 715 and a second feature map 720 are concatenated and then the entire concatenated feature map data (the first feature map 715 and the second feature map 720) is input to each of a first convolutional layer 721 and a second up-sampling layer 723 in the second neural network layer 730. A third feature map 735 is obtained from the first convolutional layer 721 and a first up-sampling layer 722 in the second neural network layer 730, and a fourth feature map 740 is obtained from the second up-sampling layer 723, a second convolutional layer 724, and a multiplication layer 725 in the second neural network layer 730.

The third feature map 735 and the fourth feature map 740 are concatenated and then the entire concatenated feature map data (the third feature map 735 and the fourth feature map 740) is input to each of a first convolutional layer 741 and a second up-sampling layer 743 in the third neural network layer 750. A fifth feature map 755 is obtained from the first convolutional layer 741 and a first up-sampling layer 742 in the third neural network layer 750, and a sixth feature map 760 is obtained from the second up-sampling layer 743, a second convolutional layer 744, and a multiplication layer 745 in the third neural network layer 750.

A current motion vector is obtained using the fifth feature map 755 and the sixth feature map 760.

When a stride of the first convolutional layer 701 is N1, a stride of the second convolutional layer 704 is N2, an upsampling ratio of the first up-sampling layer 702 is M1, and an upsampling ratio of the second up-sampling layer 703 is M2, the neural network structure of the motion vector decoder may be determined under the condition of N1*M1=N2*M2.

When a stride of the first convolutional layer 721 is N3, a stride of the second convolutional layer 724 is N4, an upsampling ratio of the first up-sampling layer 722 is M3, and an upsampling ratio of the second up-sampling layer 723 is M4, the neural network structure of the motion vector decoder may be determined under the condition of N3*M3=N4*M4.

When a stride of the first convolutional layer 741 is N5, a stride of the second convolutional layer 744 is N6, an upsampling ratio of the first up-sampling layer 742 is M5, and an upsampling ratio of the second up-sampling layer 743 is M6, the neural network structure of the motion vector decoder may be determined under the condition of N5*M5=N6*M6. The neural network structure of the motion vector decoder of FIG. 7 corresponds to the neural network structure of the motion vector encoder described above with reference to FIG. 4 or 5, and outputs a current motion vector by receiving small-sized feature data output by the motion vector encoder and restoring compressed data. Because the output current motion vector is a result of reflection of motion estimation at a plurality of resolutions, an image may be accurately restored even when the size of the original motion vector is large as well as when the size of the original motion vector is small.

Figure 8:
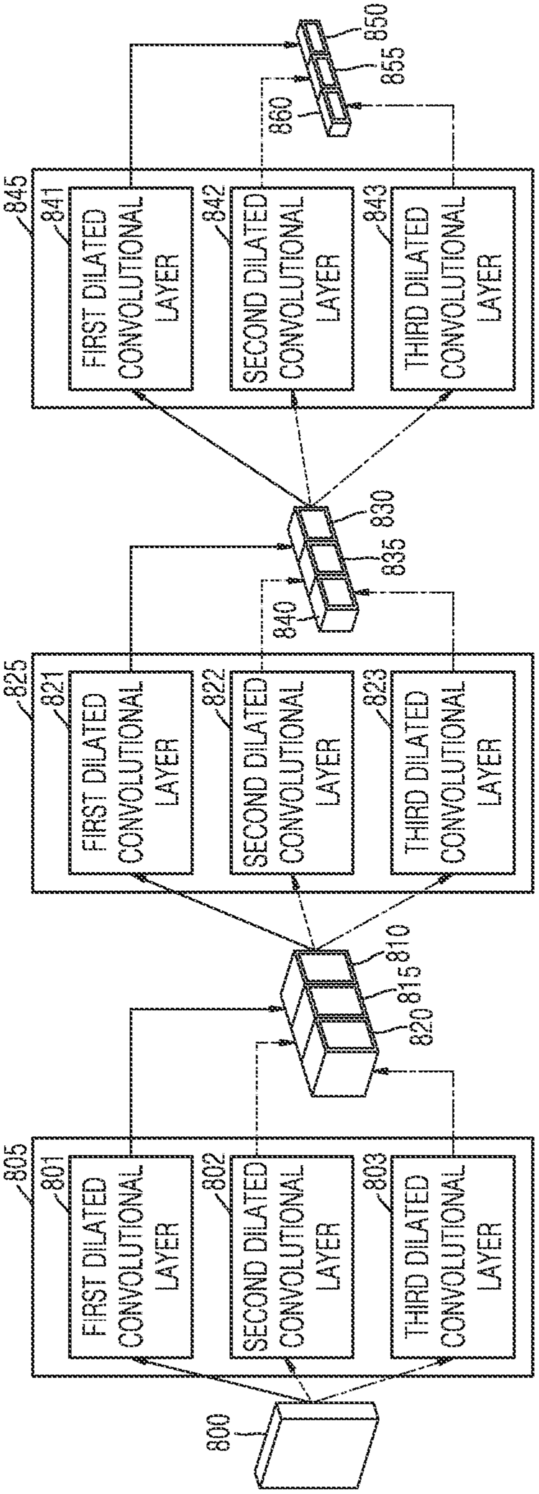
FIG. 8 is a block diagram of a neural network structure of a motion vector encoder according to an embodiment of the disclosure.

FIG. 8 is a block diagram of a neural network structure of a motion vector encoder according to an embodiment of the disclosure.

Referring to FIG. 8, the motion vector encoder 110 may include a plurality of neural network layers, namely, first, second, and third neural network layers 805, 825, and 845. In detail, all pixel data of an input image 800 obtained by concatenating a current image with a previous reconstructed image is input to each of a first dilated convolutional layer 801, a second dilated convolutional layer 802, and a third dilated convolutional layer 803 in the first neural network layer 805 in the motion vector encoder 110. A first feature map 810 is obtained from the first dilated convolutional layer 801 in the first neural network layer 805, a second feature map 815 is obtained from the second dilated convolutional layer 802 in the first neural network layer 805, and a third feature map 820 is obtained from the third dilated convolutional layer 803 in the first neural network layer 805.

The first dilated convolutional layer 801 may be a layer on which a dilated convolution operation with a dilated rate of 1 is performed, the second dilated convolutional layer 802 may be a layer on which an dilated convolution operation with a dilated rate of d2 is performed, and the third dilated convolutional layer 803 may be a layer on which an dilated convolution operation with a dilated rate of d3 is performed.

The first dilated convolutional layer 801, the second dilated convolutional layer 802, and the third dilated convolutional layer 803 are layers in which convolution operations having different dilated rates and the same strides are performed.

A detailed description of 'dilated convolution' will be described later with reference to FIG. 11.

Because an dilated convolution operation may reduce the size of input data by a dilated rate, the first feature map 810 obtained from the first dilated convolutional layer 801 having a dilated rate of 1 may be a feature map for the original resolution of an input image, the second feature map 815 obtained from the second dilated convolutional layer 802 having a dilated rate d2 may be a feature map for a resolution downscaled based on d2 from the original resolution of the input image, and the third feature map 820 obtained from the third dilated convolutional layer 803 having a dilated rate of d3 may be a feature map for a resolution downscaled based on d3 from the original resolution of the input image. The value of d2 may be 2 and the value of d3 may be 3.

The first feature map 810, the second feature map 815, and the third feature map 820 are concatenated and then the entire concatenated feature map data (the first feature map 810, the second feature map 815, and the third feature map 820) is input to each of a first dilated convolutional layer 821, a second dilated convolutional layer 822, and a third dilated convolutional layer 823 in the second neural network layer 825. A fourth feature map 830 is obtained from the first dilated convolutional layer 821 in the second neural network layer 825, a fifth feature map 835 is obtained from the second dilated convolutional layer 822 in the second neural network layer 825, and a sixth feature map 840 is obtained from the third dilated convolutional layer 823 in the second neural network layer 845.

The first dilated convolutional layer 821 may be the same as the first dilated convolutional layer 801, the second dilated convolutional layer 822 may be the same as the second dilated convolutional layer 802, and the third dilated convolutional layer 823 may be the same as the third dilated convolutional layer 803. Accordingly, the fourth feature map 830 may be a feature map for the original resolution of the input image, the resolution downscaled based on d2 from the original resolution of the input image, and the resolution downscaled based on d3 from the original resolution of the input image, the fifth feature map 835 may be a feature map for the resolution downscaled based on d2 from the original resolution of the input image, a resolution downscaled twice based on d2 from the original resolution of the input image, and a resolution downscaled based on d3 and d2 from the original resolution of the input image, and the sixth feature map 840 may be a feature map for the resolution downscaled based on d3 from the original resolution of the input image, the resolution downscaled based on d2 and d3 from the original resolution of the input image, and a resolution downscaled twice based on d3 from the original resolution of the input image.

The first dilated convolutional layer 821, the second dilated convolutional layer 822, and the third dilated convolutional layer 823 are layers in which convolution operations having different dilated rates and the same strides are performed.

The fourth feature map 830, the fifth feature map 835, and the sixth feature map 840 are concatenated and then the entire concatenated feature map data (the fourth feature map 830, the fifth feature map 835, and the sixth feature map 840) is input to each of a first dilated convolutional layer 841, a second dilated convolutional layer 842, and a third dilated convolutional layer 843 in the third neural network layer 845. A seventh feature map 850 is obtained from the first dilated convolutional layer 841 in the third neural network layer 845, an eighth feature map 855 is obtained from the second dilated convolutional layer 842 in the third neural network layer 845, and a ninth feature map 860 is obtained from the third dilated convolutional layer 843 in the third neural network layer 845.

The first dilated convolutional layer 841 may be the same as the first dilated convolutional layer 801, the second dilated convolutional layer 842 may be the same as the second dilated convolutional layer 802, and the third dilated convolutional layer 843 may be the same as the third dilated convolutional layer 803. Accordingly, the seventh feature map 850 may be a feature map for the original resolution of the input image, the resolution downscaled based on d2 from the original resolution of the input image, the resolution downscaled based on d3 from the original resolution of the input image, the resolution downscaled twice based on d2 from the original resolution of the input image, the resolution downscaled based on d3 and d2 from the original resolution of the input image, and the resolution downscaled twice based on d3 from the original resolution of the input image, the eighth feature map 855 may be a feature map for the resolution downscaled based on d2 from the original resolution of the input image, the resolution downscaled twice based on d2 from the original resolution of the input image, the resolution downscaled based on d3 and d2 from the original resolution of the input image, a resolution downscaled three times based on d2 from the original resolution of the input image, a resolution downscaled once based on d3 and twice based on d2 from the original resolution of the input image, and a resolution downscaled twice based on d3 and once based on d2 from the original resolution of the input image, and the ninth feature map 860 may be a feature map for the resolution downscaled based on d3 from the original resolution of the input image, the resolution downscaled twice based on d2 and d3 from the original resolution of the input image, the resolution downscaled twice based on d3 from the original resolution of the input image, the resolution downscaled twice based on d2 and once based on d3 from the original resolution of the input image, the resolution downscaled twice based on d3 and once based on d2 from the original resolution of the input image, and a resolution downscaled three times based on d3 from the original resolution of the input image.

The first dilated convolutional layer 841, the second dilated convolutional layer 842, and the third dilated convolutional layer 843 are layers in which convolution operations having different dilated rates and the same strides are performed.

Because the effective receptive field is very large in the case of the feature map for the resolution obtained by downscaling the original resolution of the input image three times based on d3, as compared to a feature map for a relatively large scale resolution, the case of the feature map for the resolution obtained by downscaling the original resolution of the input image three times based on d3 may be effective in estimating a large motion vector. Because only feature maps for the same resolution are obtained in a general neural network structure, the effective receptive field is limited, whereas, in the motion vector encoder of FIG. 8, the effective receptive field is extended for layers that output a feature map with a downscaled resolution, due to a dilated convolution operation is performed.

Motion vector feature data of a current image of a plurality of resolutions is obtained using the seventh feature map 850, the eighth feature map 855, and the ninth feature map 860.

The motion vector encoder includes at least one layer that downscales a feature map.

Because an output from each of the layers of the motion vector encoder is a mixture of feature maps of the plurality of resolutions, final output data from the motion vector encoder is the motion vector feature data of the current image of the plurality of resolutions. The finally output motion vector feature data of the current image of the plurality of resolutions is compressed in the size of the feature map through the motion vector encoder to thereby reduce a bit rate.

Figure 9:
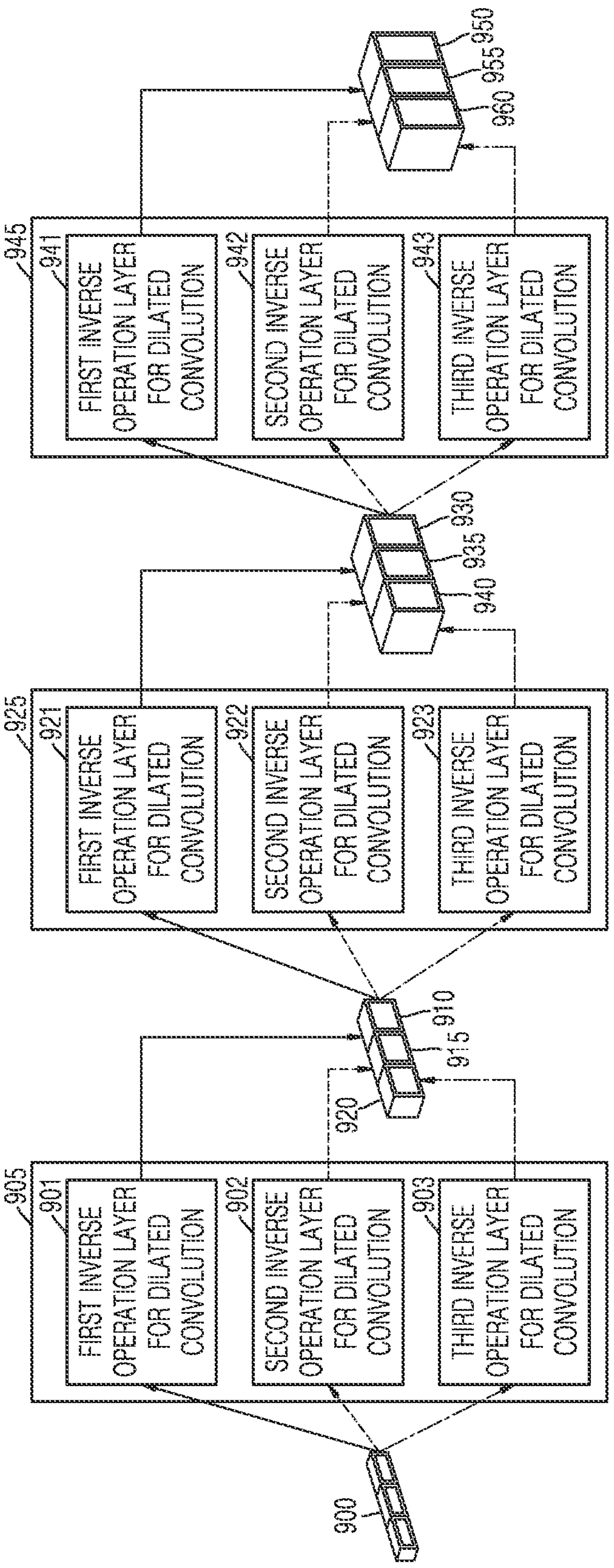
FIG. 9 is a block diagram of a neural network structure of a motion vector decoder according to an embodiment of the disclosure.

FIG. 9 is a block diagram of a neural network structure of a motion vector decoder according to an embodiment of the disclosure.

Referring to FIG. 9, the motion vector decoder 150 may include a plurality of neural network layers, namely, first, second, and third neural network layers 905, 925, and 945. In detail, motion vector feature data 900 for a current image of a plurality of resolutions is input to each of a first inverse operation layer 901, a second inverse operation layer 902, and a third inverse operation layer 903 in the first neural network layer 905 in the motion vector decoder 150. A first feature map 910 is obtained from the first inverse operation layer 901 for a first dilated convolution in the first neural network layer 905, a second feature map 915 is obtained from the second inverse operation layer 902 for a second dilated convolution in the first neural network layer 905, and a third feature map 915 is obtained from the third inverse operation layer 903 for a third dilated convolution in the first neural network layer 905.

The first inverse operation layer 901 performs an inverse operation corresponding to the first dilated convolutional layer 801 of FIG. 8, the second inverse operation layer 902 performs an inverse operation corresponding to the second dilated convolutional layer 802 of FIG. 8, and the third inverse operation layer 903 performs an inverse operation corresponding to the third dilated convolutional layer 803 of FIG. 8.

The first inverse operation layer 901, the second inverse operation layer 902, and the third inverse operation layer 903 perform inverse operations of a dilated convolution having different dilated rates and the same strides.

The first feature map 910, the second feature map 915, and the third feature map 920 are concatenated and then the entire concatenated feature map data (the first feature map 910, the second feature map 915, and the third feature map 920) is input to each of a first inverse operation layer 921, a second inverse operation layer 922, and a third inverse operation layer 923 in the second neural network layer 925. A fourth feature map 930 is obtained from the first inverse operation layer 921 for a first dilated convolution in the second neural network layer 925, a fifth feature map 935 is obtained from the second inverse operation layer 922 for a second dilated convolution in the second neural network layer 925, and a sixth feature map 930 is obtained from the third inverse operation layer 923 for a third dilated convolution in the second neural network layer 925.

The first inverse operation layer 921, the second inverse operation layer 922, and the third inverse operation layer 923 perform inverse operations of a dilated convolution having different dilated rates and the same strides.

The fourth feature map 930, the fifth feature map 935, and the sixth feature map 940 are concatenated and then the entire concatenated feature map data (the fourth feature map 930, the fifth feature map 935, and the sixth feature map 940) is input to each of a first inverse operation layer 941, a second inverse operation layer 942, and a third inverse operation layer 943 in the third neural network layer 945. A seventh feature map 950 is obtained from the first inverse operation layer 941 for a first dilated convolution in the third neural network layer 945, an eighth feature map 955 is obtained from the second inverse operation layer 942 for a second dilated convolution in the third neural network layer 945, and a ninth feature map 960 is obtained from the third inverse operation layer 943 for a third dilated convolution in the third neural network layer 945.

The first inverse operation layer 941, the second inverse operation layer 942, and the third inverse operation layer 943 perform inverse operations of a dilated convolution having different dilated rates and the same strides.

A current motion vector is obtained using the seventh feature map 950, the eighth feature map 955, and the ninth feature map 960.

The neural network structure of the motion vector decoder of FIG. 9 corresponds to the neural network structure of the motion vector encoder described above with reference to FIG. 8, and outputs the current motion vector by receiving small-sized feature data output by the motion vector encoder and restoring compressed data. Because the output current motion vector is a result of reflection of motion estimation at a plurality of resolutions, an image may be accurately restored even when the size of the original motion vector is large as well as when the size of the original motion vector is small.

Figure 10:
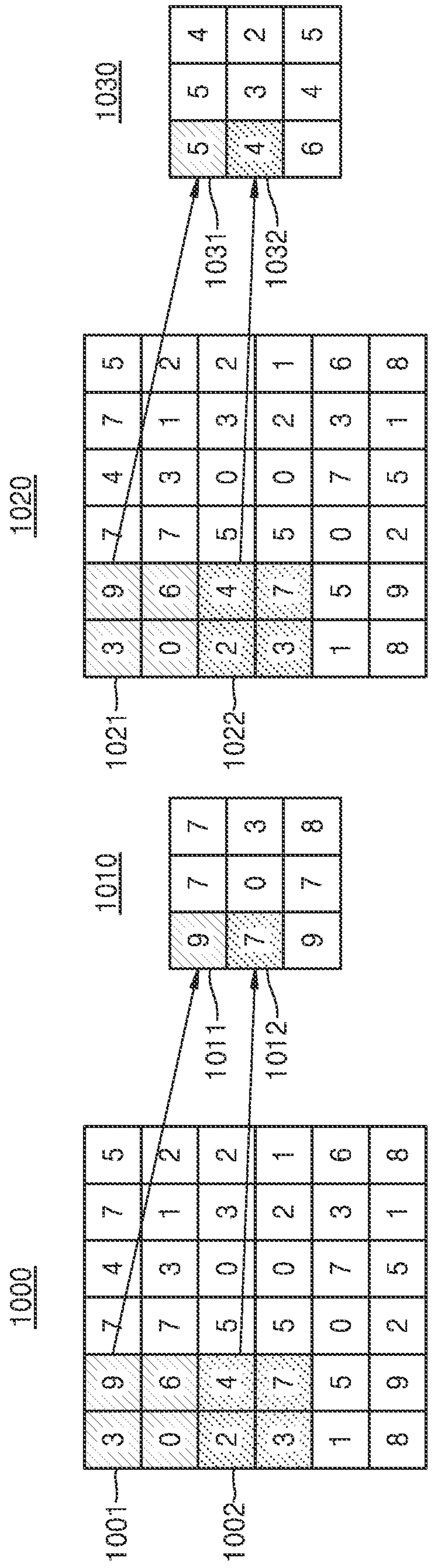
FIG. 10 is a view for explaining a method by which pooling is performed.

FIG. 10 is a view for explaining a method by which pooling is performed.

Referring to FIG. 10, max-pooling may be applied to a first feature map 1000 having a size of 6×6 to reduce the dimension of the first feature map 1000 by half, resulting in the generation of a second feature map 1010 having a size of 3×3. During this max-pooling operation, the value of 9, which is the value of a largest pixel among four 2×2 pixels 1001 in an upper left portion of the first feature map 1000, becomes a pixel value of an upper left pixel 1011 within the second feature map 1010. The value of 7, a largest pixel value among four 2×2 pixels 1002 in a left portion of the first feature map 1000, becomes a pixel value of a left pixel 1012 within the second feature map 1010.

Average-pooling to reduce the dimension to ½ may be performed on a third feature map 1020 having a size of 6×6, and thus a fourth feature map 1030 having a size of 3×3 may be obtained. In the average-pooling, a pixel value of a reduced feature map may be obtained by calculating an average value of pixels or rounding up the average value. In this case, the value of 5, which is a rounded value of 4.5 that is obtained by calculating an average value of four 2×2 pixels 1021 in an upper left portion of the third feature map 1020, becomes a pixel value of an upper left pixel 1031 within the fourth feature map 1030. The value of 4, which is an average value of four 2×2 pixels 1002 in a left portion of the third feature map 1020, becomes a pixel value of a left pixel 1032 within the fourth feature map 1030.

In addition, min-pooling to determine the pixel value of a smallest value among the pixels as the pixel value of a reduced feature map may be used. The above-described pooling methods are presented as examples, and embodiments of the disclosure are not limited thereto.

Pooling may be applied to create a reduced-scale feature map or frame from a current input feature map or a current input frame, effectively lowering a resolution of the current input feature map or frame. Accordingly, an effective receptive field may be extended to enable the estimation of a large motion at a low resolution with a limited search range.

Figure 11:
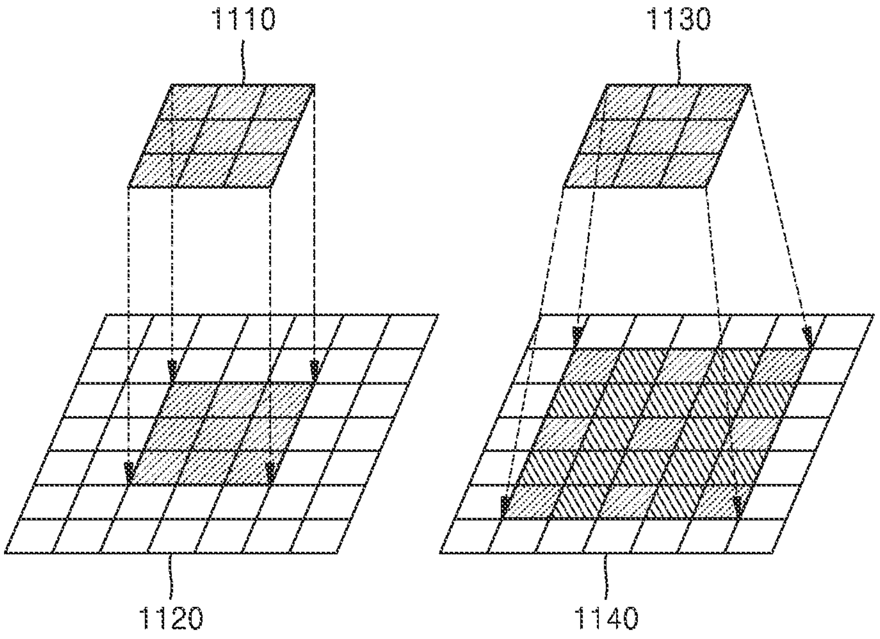
FIG. 11 is a view for explaining an example of a method by which dilated convolution is performed.

FIG. 11 is a view for explaining an example of a method by which dilated convolution is performed.

Referring to FIG. 11, in common convolution, a convolution operation is performed by applying a 3×3 convolution filter 1110 to a feature map 1120, which is to be subject to the convolution operation, without changes. This corresponds to a case where a dilated rate is 1.

However, in the case of dilated convolution where a 3×3 convolution filter 1130 is used and a dilated rate is 2, values with zero weight are padded one by one between each filter weight of the 3×3 convolution filter 1130, and thus a convolution operation is performed in the same manner as when a 5×5 convolution filter is applied to a feature map 1140, which is to be subjected to a convolution operation.

In the case of dilated convolution where the 3×3 convolution filter is used and a dilated rate is 3, two values with zero weight are padded between each filter weight of the 3×3 convolution filter 1130, and thus a convolution operation may be performed in the same manner as when a 7×7 convolution filter is applied to a feature map, which is to be subjected to a convolution operation.

When dilated convolution with a large dilated rate is performed, a large receptive field corresponding to a small scale may be obtained, and, when dilated convolution with a small dilated rate is performed, a small receptive field corresponding to a relatively large scale may be obtained.

In dilated convolution, a current input feature map or a current input frame may be used to generate a feature map or frame of a small scale (i.e., a small resolution), and feature maps or frames of various scales may be generated by using dilated convolutions of various dilated rates. Accordingly, an effective receptive field may be extended to estimate a motion vector of a large size.

Figure 12:
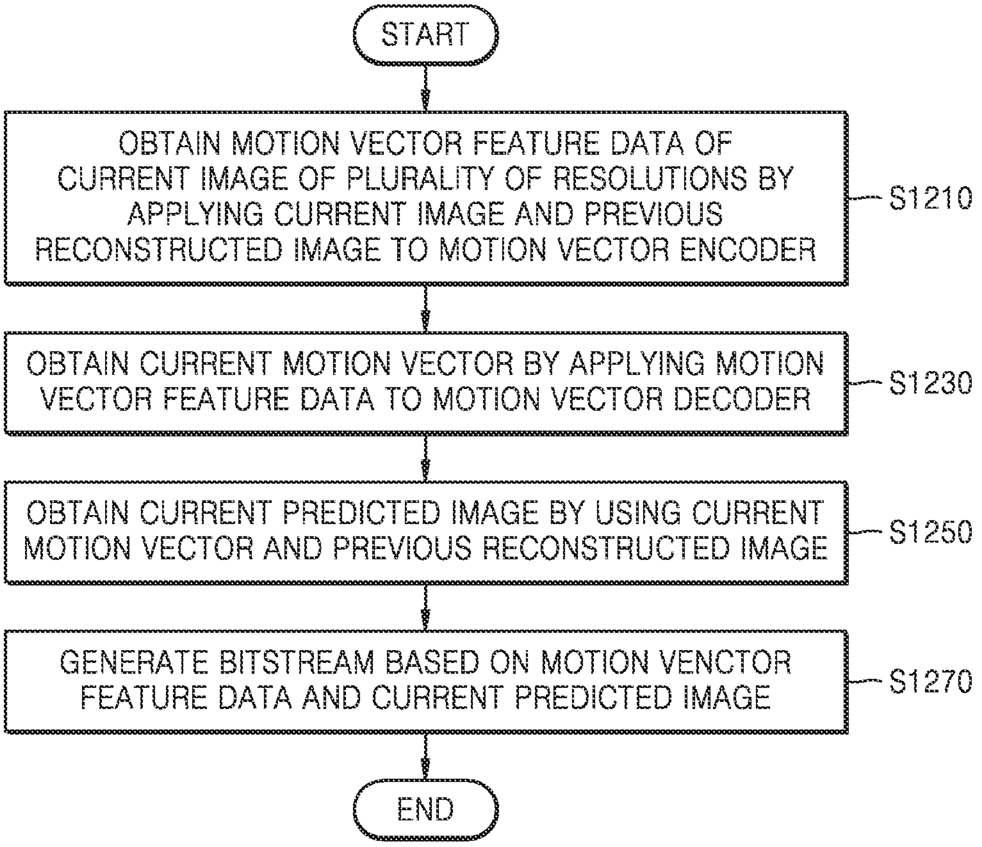
FIG. 12 is a flowchart of an image encoding method according to an embodiment of the disclosure.

FIG. 12 is a flowchart of an image encoding method according to an embodiment of the disclosure.

In operation S1210, an image encoding apparatus 1300 obtains motion vector feature data of the current image of a plurality of resolutions by applying the current image and a previous reconstructed image to a motion vector encoder.

According to an embodiment of the disclosure, the plurality of resolutions may include an original resolution of the current image and a resolution downscaled from the original resolution of the current image.

According to an embodiment of the disclosure, the motion vector encoder may include a plurality of first encoding neural network layers, each of the first encoding neural network layers may include a first encoding layer and a second encoding layer which operate in parallel, the first encoding layer may include a first convolutional layer and the second encoding layer may include a pooling layer and a second convolutional layer. The first encoding layer and the second encoding layer may operate simultaneously to process two separate data streams in parallel.

According to an embodiment of the disclosure, the motion vector encoder may include a plurality of second encoding neural network layers, each of the second encoding neural network layers may include a third encoding layer and a fourth encoding layer which operate in parallel, the third encoding layer may include a third convolutional layer and a first pooling layer, and the fourth encoding layer may include a second pooling layer and a fourth convolutional layer.

According to an embodiment of the disclosure, the motion vector encoder may include a plurality of third encoding neural network layers, and each of the third encoding neural network layers may include a first dilated convolutional layer, a second dilated convolutional layer, and a third dilated convolutional layer which operate in parallel. The first dilated convolutional layer, the second dilated convolutional layer, and the third dilated convolutional layer may operate simultaneously to process separate data streams in parallel.

According to an embodiment of the disclosure, the current image may be feature data output by applying pixel data of the current image to a convolutional neural network, and the previous reconstructed image may be feature data output by applying pixel data of the previous reconstructed image to a convolutional neural network. In other words, the current image and the previous reconstructed image may be feature map domains.

According to an embodiment of the disclosure, the current image may be the pixel data of the current image, and the previous reconstructed image may be the pixel data of the previous reconstructed image. In other words, the current image and the previous reconstructed image may be pixel domains.

In operation S1230, the image encoding apparatus 1300 obtains a current motion vector by applying the motion vector feature data to a motion vector decoder.

According to an embodiment of the disclosure, the motion vector decoder may include a plurality of first decoding neural network layers, each of the decoding layer which operate in parallel, the first decoding layer may include a first up-convolutional layer, and the second decoding layer may include a second up-convolutional layer and a first multiplication layer for multiplying an input by an upscaling ratio corresponding to a downscaling ratio.

According to an embodiment of the disclosure, the motion vector decoder may include a plurality of second decoding neural network layers, each of the second decoding neural network layers may include a third decoding layer and a fourth decoding layer which operate in parallel, the third decoding layer may include a first convolutional layer and a first upsampling layer, and the fourth decoding layer may include a second convolutional layer and a first multiplication layer for multiplying an input by an upscaling ratio corresponding to a downscaling ratio.

According to an embodiment of the disclosure, the motion vector decoder may include a plurality of third decoding neural network layers, and each of the third decoding neural network layers may include a first inverse operation layer for dilated convolution, a second inverse operation layer for dilated convolution, and a third inverse operation layer for dilated convolution which operate in parallel. The first inverse operation layer, the second inverse operation layer, and the third inverse operation layer may operate simultaneously to process separate data streams in parallel.

In operation S1250, the image encoding apparatus 1300 obtains a current predicted image by using the current motion vector and the previous reconstructed image.

In operation S1270, the image encoding apparatus 1300 generates a bitstream including the motion vector feature data.

According to an embodiment of the disclosure, the image encoding apparatus 1300 may obtain a current residual image corresponding to a difference between the current predicted image and the current image, and may obtain feature data of the current residual image by applying the current residual image to a residual encoder.

According to an embodiment of the disclosure, the bitstream may further include the feature data of the current residual image.

Figure 13:
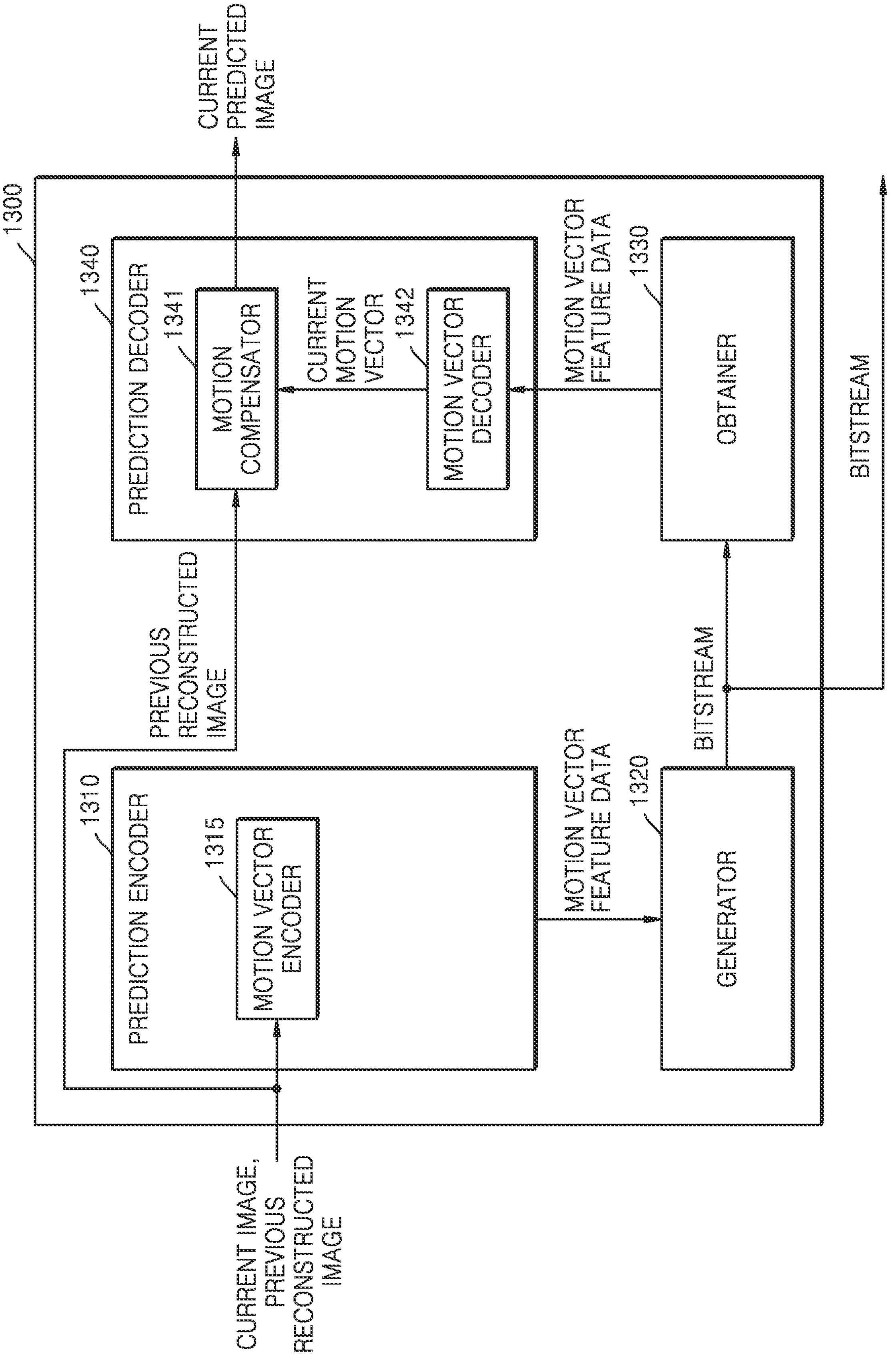
FIG. 13 is a block diagram of a structure of an image encoding apparatus according to an embodiment of the disclosure.

FIG. 13 is a block diagram of a structure of the image encoding apparatus according to an embodiment of the disclosure.

Referring to FIG. 13, the image encoding apparatus 1300 according to an embodiment of the disclosure may include a prediction encoder 1310, a generator 1320, an obtainer 1330, and a prediction decoder 1340.

The prediction encoder 1310, the generator 1320, the obtainer 1330, and the prediction decoder 1340 may be implemented as processors. The prediction encoder 1310, the generator 1320, the obtainer 1330, and the prediction decoder 1340 may operate according to instructions stored in a memory.

Although the prediction encoder 1310, the generator 1320, the obtainer 1330, and the prediction decoder 1340 are individually illustrated in FIG. 13, the prediction encoder 1310, the generator 1320, the obtainer 1330, and the prediction decoder 1340 may be implemented as one processor. In this case, the prediction encoder 1310, the generator 1320, the obtainer 1330, and the prediction decoder 1340 may be implemented as a dedicated processor, or may be implemented through a combination of software and a general-purpose processor such as an application processor (AP), a central processing unit (CPU), or a graphics processing unit (GPU).

The dedicated processor may include a memory for implementing an embodiment of the disclosure or a memory processing unit for using an external memory.

The prediction encoder 1310, the generator 1320, the obtainer 1330, and the prediction decoder 1340 may be implemented as a plurality of processors. In this case, the prediction encoder 1310, the generator 1320, the obtainer 1330, and the prediction decoder 1340 may be implemented as a combination of dedicated processors, or may be implemented through a combination of software and a plurality of general-purpose processors such as APs, CPUs, or GPUs. The processor may include a dedicated artificial intelligence (AI) processor. As another example, the dedicated AI processor may be configured as a separate chip from the processor.

The prediction encoder 1310 includes a motion vector encoder 1315. The prediction encoder 1310 obtains motion vector feature data of a current image of a plurality of resolutions by applying the current image and a previous reconstructed image to the motion vector encoder 1315.

The generator 1320 generates a bitstream including the motion vector feature data obtained by the prediction encoder 1310.

The obtainer 1330 obtains the motion vector feature data from the bitstream generated by the generator 1320.

The prediction encoder 1310 may directly transmit the motion vector feature data of the current image of the plurality of resolutions to the prediction decoder 1340 without using the generator 1320 and the obtainer 1330.

The prediction decoder 1340 includes a motion compensator 1341 and a motion vector decoder 1342. The prediction decoder 1340 obtains a current motion vector by applying the motion vector feature data to the motion vector decoder 1342. The prediction decoder 1340 transmits the current motion vector to the motion compensator 1341. The prediction decoder 1340 obtains the previous reconstructed image and transmits the same to the motion compensator 1341.

The motion compensator 1341 of the prediction decoder 1340 obtains a current predicted image by using the current motion vector and the previous reconstructed image.

The generator 1320 entropy-encodes the motion vector feature data through cost calculation such as sum of transform difference (SATD) or rate distortion optimization (RDO) calculation, based on a result of the prediction by the prediction decoder 1340, to generate a bitstream and transmit the same to an image decoding apparatus 1500.

The motion vector encoder 1315 and the motion vector decoder 1342 may be implemented as a neural network including one or more layers (e.g., a convolutional layer). In detail, the motion vector encoder 1315 may include one neural network structure among the neural network structures of FIGS. 4, 5, and 8. The motion vector decoder 1342 may include one neural network structure among the neural network structures of FIGS. 6, 7, and 9.

The motion vector encoder 1315 and the motion vector decoder 1342 may be stored in a memory. The motion vector encoder 1315 and the motion vector decoder 1342 may be implemented as at least one dedicated processor for AI.

According to an embodiment of the disclosure, the prediction encoder 1310 may further include a residual encoder. The prediction encoder 1310 may obtain the current predicted image from the prediction decoder 1340. The prediction encoder 1310 may obtain a current residual image corresponding to a difference between the current predicted image and the current image, and may obtain feature data of the current residual image by applying the current residual image to a residual encoder.

According to an embodiment of the disclosure, the generator 1320 may generate a bitstream further including the feature data of the current residual image obtained by the prediction encoder 1310.

According to an embodiment of the disclosure, the obtainer 1330 may further obtain the feature data of the current residual image from the bitstream generated by the generator 1320.

According to an embodiment of the disclosure, the prediction decoder 1340 may further include a residual decoder. The prediction decoder 1340 may obtain the current residual image by applying the feature data of the current residual image to the residual decoder. The prediction decoder 1340 may obtain a current reconstructed image by using the current predicted image and the current residual image.

The residual encoder and the residual decoder may be implemented as a neural network including one or more layers (e.g., a convolutional layer).

The residual encoder and the residual decoder may be stored in a memory. The residual encoder and the residual decoder may be implemented as at least one dedicated processor for AI.

Figure 14:
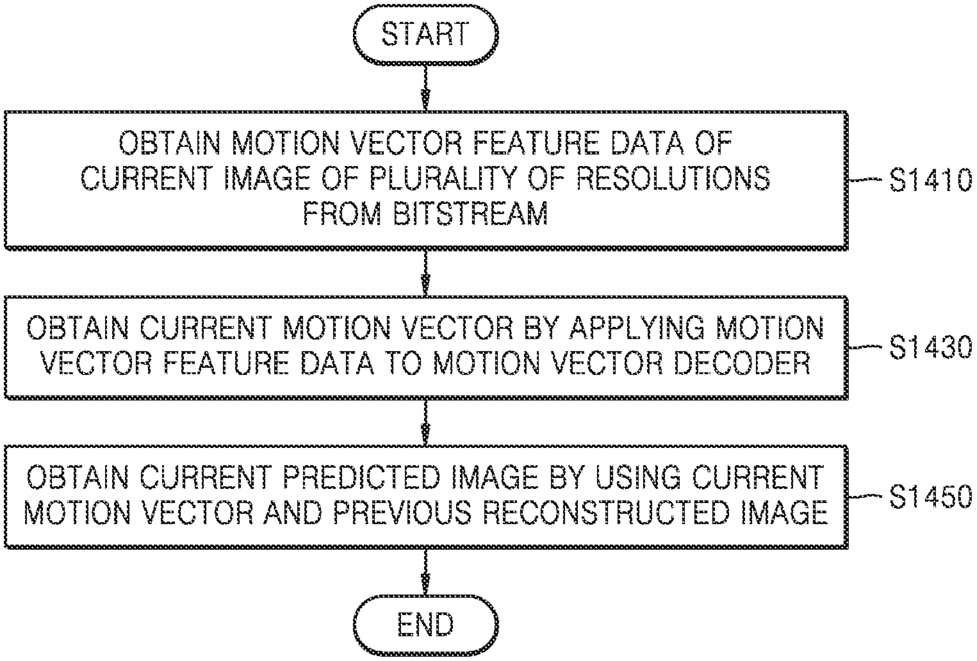
FIG. 14 is a flowchart of an image decoding method according to an embodiment of the disclosure.

FIG. 14 is a flowchart of an image decoding method according to an embodiment of the disclosure.

In operation S1410, the image decoding apparatus 1500 obtains motion vector feature data of a current image of a plurality of resolutions from a bitstream.

According to an embodiment of the disclosure, the plurality of resolutions may include an original resolution of the current image and a resolution downscaled from the original resolution of the current image.

According to an embodiment of the disclosure, the current image may be feature data output by applying pixel data of the current image to a convolutional neural network, and the previous reconstructed image may be feature data output by applying pixel data of the previous reconstructed image to a convolutional neural network. In other words, the current image and the previous reconstructed image may be feature map domains.

According to an embodiment of the disclosure, the current image may be the pixel data of the current image, and the previous reconstructed image may be the pixel data of the previous reconstructed image. In other words, the current image and the previous reconstructed image may be pixel domains.

In operation S1430, the image decoding apparatus 1500 obtains a current motion vector by applying the motion vector feature data to a motion vector decoder.

According to an embodiment of the disclosure, the motion vector decoder may include a plurality of first decoding neural network layers, each of the first decoding neural network layers may include a first decoding layer and a second decoding layer which operate in parallel, the first decoding layer may include a first up-convolutional layer, and the second decoding layer may include a second up-convolutional layer and a first operation layer for multiplying an input by an upscaling ratio corresponding to a downscaling ratio. The first decoding layer and the second decoding layer may operate simultaneously to process separate data streams in parallel.

According to an embodiment of the disclosure, the motion vector decoder may include a plurality of second decoding neural network layers, each of the second decoding neural network layers may include a third decoding layer and a fourth decoding layer which operate in parallel, the third decoding layer may include a first convolutional layer and a first upsampling layer, and the fourth decoding layer may include a second convolutional layer and a first operation layer for multiplying an input by an upscaling ratio corresponding to a downscaling ratio. The third decoding layer and the fourth decoding layer may operate simultaneously to process separate data streams in parallel.

According to an embodiment of the disclosure, the motion vector decoder may include a plurality of third decoding neural network layers, and each of the third decoding neural network layers may include a first inverse operation layer for dilated convolution, a second inverse operation layer for dilated convolution, and a third inverse operation layer for dilated convolution which operate in parallel. The first inverse operation layer, the second inverse operation layer, and the third inverse operation layer may operate simultaneously to process separate data streams in parallel.

In operation S1450, the image decoding apparatus 1500 obtains a current predicted image by using the current motion vector and the previous reconstructed image.

According to an embodiment of the disclosure, the image decoding apparatus 1500 may obtain feature data of a current residual image from the bitstream, obtain the current residual image by applying the feature data of the current residual image to the residual decoder, and obtain a current reconstructed image by using the current predicted image and the current residual image.

Figure 15:
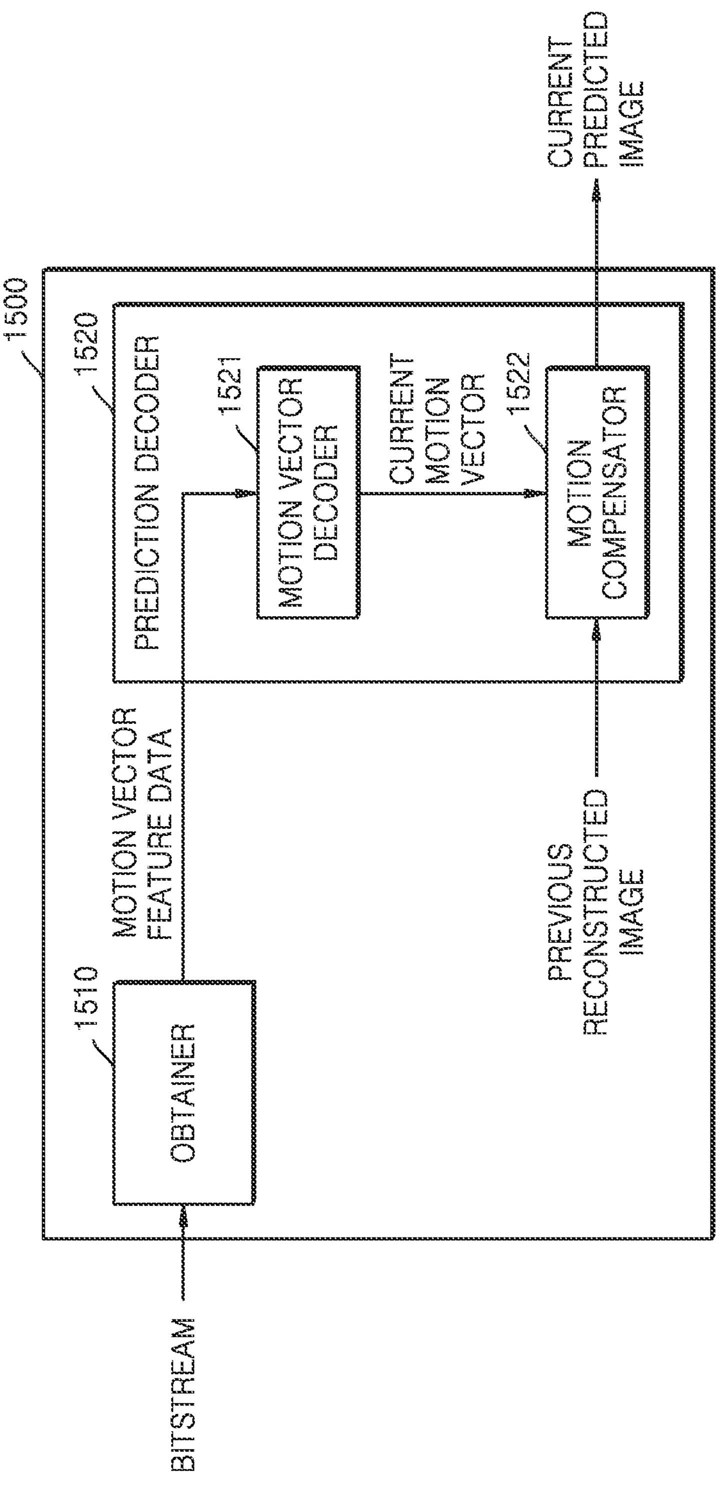
FIG. 15 is a flowchart of an image decoding method according to an embodiment of the disclosure.

FIG. 15 is a flowchart of an image decoding method according to an embodiment of the disclosure.

Referring to FIG. 15, the image decoding apparatus 1500 according to an embodiment may include an obtainer 1510 and a prediction decoder 1520.

The obtainer 1510 and the prediction decoder 1520 may be implemented as processors. The obtainer 1510 and the prediction decoder 1520 may operate according to instructions stored in a memory.

Although the obtainer 1510 and the prediction decoder 1520 are individually illustrated in FIG. 15, the obtainer 1510 and the prediction decoder 1520 may be implemented through one processor. In this case, the obtainer 1510 and the prediction decoder 1520 may be implemented as a dedicated processor, or may be implemented through a combination of software and a general-purpose processor such as an application processor (AP), a central processing unit (CPU), or a graphics processing unit (GPU). The dedicated processor may include a memory for implementing an embodiment of the disclosure or a memory processing unit for using an external memory.

The obtainer 1510 and the prediction decoder 1520 may be implemented as a plurality of processors. In this case, the obtainer 1510 and the prediction decoder 1520 may be implemented as a combination of dedicated processors, or may be implemented through a combination of software and a plurality of general-purpose processors such as APs, CPUs, or GPUs. The processor may include a dedicated AI processor. As another example, the dedicated AI processor may be configured as a separate chip from the processor.

The obtainer 1510 receives a bitstream from an image encoding apparatus.

The obtainer 1510 obtains motion vector feature data from the bitstream.

The prediction decoder 1520 includes a motion compensator 1522 and a motion vector decoder 1521. The prediction decoder 1520 obtains a current motion vector by applying the motion vector feature data to the motion vector decoder 1521. The prediction decoder 1520 transmits the current motion vector to the motion compensator 1522. The prediction decoder 1520 obtains a previous reconstructed image and transmits the same to the motion compensator 1522.

The motion compensator 1522 of the prediction decoder 1520 obtains a current predicted image by using the current motion vector and the previous reconstructed image.

The motion vector decoder 1521 may be implemented as a neural network including one or more layers (e.g., a convolutional layer). In detail, the motion vector decoder 1521 may include one neural network structure among the neural network structures of FIGS. 6, 7, and 9.

The motion vector decoder 1521 may be stored in a memory. The motion vector decoder 1521 may be implemented as at least one dedicated processor for AI.

According to an embodiment of the disclosure, the obtainer 1510 may further obtain feature data of the current residual image from the bitstream.

According to an embodiment of the disclosure, the prediction decoder 1520 may further include a residual decoder. The prediction decoder 1520 may obtain the current residual image by applying the feature data of the current residual image to the residual decoder. The prediction decoder 1340 may obtain a current reconstructed image by using the current predicted image and the current residual image.

The residual decoder may be implemented as a neural network including one or more layers (e.g., a convolutional layer).

The residual decoder may be stored in a memory. The residual decoder may be implemented as at least one dedicated processor for AI.

Figure 16:
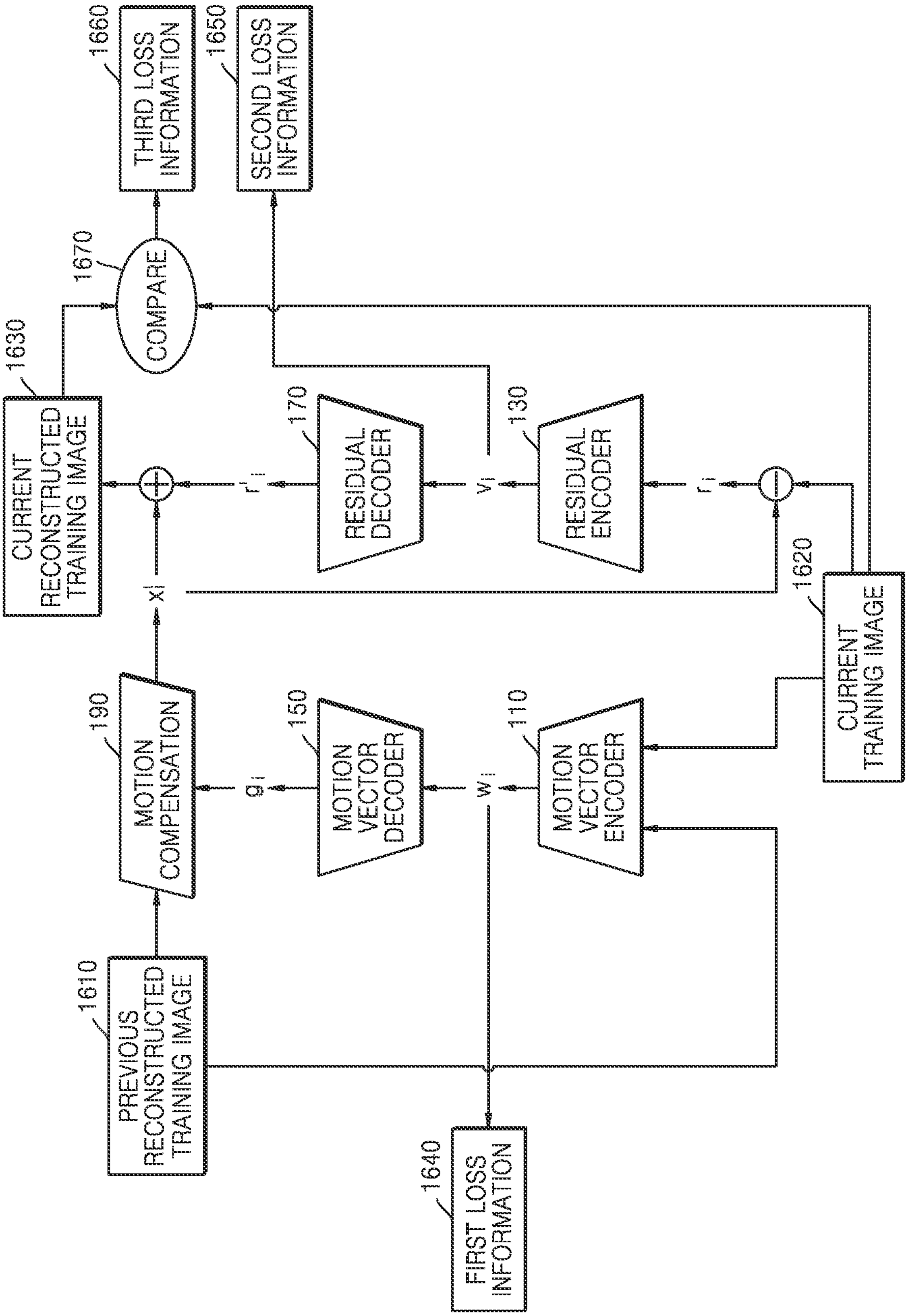
FIG. 16 is a diagram for describing a method of training a motion vector encoder, a motion vector decoder, a residual encoder, and a residual decoder, according to an embodiment of the disclosure.

FIG. 16 is a diagram for describing a method of training a motion vector encoder, a motion vector decoder, a residual encoder, and a residual decoder, according to an embodiment of the disclosure.

In FIG. 16, a current training image 1620, a previous reconstructed training image 1610, a current predicted training image $x'_i$, and a current reconstructed training image 1630 correspond to the aforementioned current image, the aforementioned previous reconstructed image, the aforementioned current predicted image, and the aforementioned current reconstructed image, respectively.

When the motion vector encoder 110, the motion vector decoder 150, the residual encoder 130, and the residual decoder 170 are trained, a similarity between the current reconstructed training image 1630 and the current training image 1620 and a bit rate of a bitstream to be generated by encoding the current training image 1620 need to be considered.

To this end, according to an embodiment of the disclosure, the motion vector encoder 110, the motion vector decoder 150, the residual encoder 130, and the residual decoder 170 may be trained according to first loss information 1640 and second loss information 1650 corresponding to a size of the bitstream and third loss information 1660 corresponding to the similarity between the current training image 1620 and the current reconstructed training image 1630.

Referring to FIG. 16, the current training image 1620 and the previous reconstructed training image 1610 may be input to the motion vector encoder 110. The motion vector encoder 110 may output motion vector feature data $w_i$ of a current image of a plurality of resolutions by processing the current training image 1620 and the previous reconstructed training image 1610.

The motion vector feature data $w_i$ of the current image of a plurality of resolutions may be input to the motion vector decoder 150, and the motion vector decoder 150 may process the motion vector feature data $w_i$ of the current image of a plurality of resolutions to output a current motion vector $g_i$.

The current predicted training image $x'_i$ may be generated by performing motion compensation 190 by using the previous reconstructed training image 1610 and the current motion vector $g_i$.

The residual training image $r_i$ may be generated using the current predicted training image $x'_i$ and the current training image 1620 and may be input to the residual encoder 130.

The residual encoder 130 may output the feature data $v_i$ of the residual image by processing the residual training image $r_i$.

The feature data $v_i$ of the residual image may be input to the residual decoder 170. The residual decoder 170 may output the reconstructed residual training image $r'_i$.

The current reconstructed training image 1630 may be obtained by combining the current predicted image $x'_i$ generated by the motion compensation 190 with respect to the previous reconstructed training image 1610 and the current motion vector $g_i$ with the reconstructed residual image data $r'_i$.

The first loss information 1640 may be calculated from entropy of the motion vector feature data $w_i$ of the current image of a plurality of resolutions or a bit rate of a bitstream corresponding to the motion vector feature data $w_i$ of the current image of a plurality of resolutions.

The second loss information 1650 may be calculated from entropy of the feature data $v_i$ of the residual image or a bit rate of a bitstream corresponding to the feature data $v_i$ of the residual image.

Because the first loss information 1640 and the second loss information 1650 are related to the efficiency of encoding the current training image 1620, the first loss information 1640 and the second loss information 1650 may be referred to as compression loss information.

According to an embodiment of the disclosure, although the first loss information 1640 and the second loss information 1650 related to the bitrate of a bitstream are derived in FIG. 16, one piece of loss information corresponding to the bitrate of one bitstream generated through encoding of the current training image 1620 may be derived.

The third loss information 1660 may correspond to a difference between the current training image 1620 and the current reconstructed training image 1630. The difference between the current training image 1620 and the current reconstructed training image 1630 may include at least one of a L1-norm value, an L2-norm value, a Structural Similarity (SSIM) value, a Peak Signal-To-Noise Ratio-Human Vision System (PSNR-HVS) value, a Multiscale SSIM (MS-SSIM) value, a Variance Inflation Factor (VIF) value, ora Video Multimethod Assessment Fusion (VMAF) value between the current training image 1620 and the current reconstructed training image 1630.

Because the third loss information 1660 is related to the quality of the current reconstructed training image 1630, the third loss information 1660 may be referred to as quality loss information.

The motion vector encoder 310, the motion vector decoder 150, the residual encoder 130, and the residual decoder 170 may be trained to reduce or minimize final loss information derived from at least one of the first loss information 1640, the second loss information 1650, or the third loss information 1660.

In detail, the motion vector encoder 110, the motion vector decoder 150, the residual encoder 130, and the residual decoder 170 may be trained to reduce or minimize final loss information while changing values of pre-set parameters.

According to an embodiment of the disclosure, the final loss information may be calculated according to Equation 1 below.

$$\text{Final loss information}=a^{*}\text{first loss information}+b^{*}\text{second loss information}+c^{*}\text{third loss information} \quad \text{[Equation 1]}$$

In Equation 1, a, b, and c denote weights that are applied to the first loss information 1640, the second loss information 1650, and the third loss information 1660, respectively.

According to Equation 1, it is found that the motion vector encoder 110, the motion vector decoder 150, the residual encoder 130, and the residual decoder 170 may be trained so that the current reconstructed training image 1630 is as similar as possible to the current training image 1620 and a size of a bitstream corresponding to data output from the motion vector encoder 110 and the residual encoder 130 is minimized.

An image encoding method based on AI according to an embodiment of the disclosure may include obtaining motion vector feature data of a current image of a plurality of resolutions by applying the current image and a previous reconstructed image to a motion vector encoder, obtaining a current motion vector by applying the motion vector feature data to a motion vector decoder, obtaining a current predicted image by using the current motion vector and a previous reconstructed image, and generating a bitstream including the motion vector feature data. The plurality of resolutions may include an original resolution of the current image and a resolution downscaled from the original resolution of the current image.

According to an embodiment of the disclosure, the image encoding method based on AI may further include obtaining a current residual image corresponding to a difference between the current predicted image and the current image; and obtaining feature data of the current residual image by applying the current residual image to a residual encoder, wherein the bitstream may further include feature data of the current residual image.

According to an embodiment of the disclosure, the motion vector decoder may include a plurality of first decoding neural network layers, each of the plurality of first decoding neural network layers may include a first decoding layer and a second decoding layer in parallel, the first decoding layer may include a first up-convolutional layer, the second decoding layer may include a second up-convolutional layer and a first multiplication layer that multiplies an input by an upscaling ratio corresponding to a downscaling ratio, the motion vector encoder may include a plurality of first encoding neural network layers, each of the plurality of first encoding neural network layers may include a first encoding layer and a second encoding layer in parallel, the first encoding layer may include a first convolutional layer, and the second encoding layer may include a pooling layer and a second convolutional layer.

According to an embodiment of the disclosure, the motion vector decoder may include a plurality of second decoding neural network layers, each of the plurality of second decoding neural network layers may include a third decoding layer and a fourth decoding layer in parallel, the third decoding layer may include a first convolutional layer and a first upsampling layer, the fourth decoding layer may include a second upsampling layer, a second convolutional layer, and a first multiplication layer that multiplies an input by an upscaling ratio corresponding to a downscaling ratio, the motion vector encoder may include a plurality of second encoding neural network layers, each of the plurality of second encoding neural network layers may include a third encoding layer and a fourth encoding layer in parallel, the third encoding layer may include a third convolutional layer and a first pooling layer, and the fourth encoding layer may include a second pooling layer and a fourth convolutional layer.

According to an embodiment of the disclosure, the motion vector decoder may include a plurality of third decoding neural network layers, each of the plurality of third decoding neural network layers may include a first inverse operation layer for dilated convolution, a second inverse operation layer for dilated convolution, and a third inverse operation layer for dilated convolution in parallel, the motion vector decoder may include a plurality of third encoding neural network layers, and each of the plurality of third encoding neural network layers may include a first dilated convolutional layer, a second dilated convolutional layer, and a third dilated convolutional layer in parallel.

According to an embodiment of the disclosure, the current image may be feature data output by applying pixel data of the current image to a convolutional neural network, and the previous reconstructed image may be feature data output by applying pixel data of the previous reconstructed image to a convolutional neural network.

According to an embodiment of the disclosure, the current image may be the pixel data of the current image, and the previous reconstructed image may be the pixel data of the previous reconstructed image.

The image encoding method based on AI according to an embodiment of the disclosure obtains the motion vector feature data for the current image of a plurality of resolutions by using a motion vector encoder having a neural network structure including a neural network layer for maintaining the resolution of an input image and a neural network layer for downscaling the resolution of the input image, and obtains a current motion vector by applying the motion vector feature data to a motion vector decoder, and thus is effective in estimating not only a motion vector of a small size but also a motion of a large size by applying a extended effective receptive field. Because the motion vector feature data for the current image of a plurality of resolutions obtained from the motion vector encoder is a feature map of a small size output from a final layer and also a feature map for all scales, the image encoding method is efficient for encoding feature data of a plurality of scales in terms of data compression, and is suitable for video coding.

An image decoding method based on AI according to an embodiment of the disclosure may include obtaining motion vector feature data of a current image of a plurality of resolutions from a bitstream, obtaining a current motion vector by applying the motion vector feature data to a motion vector decoder; and obtaining a current predicted image by using the current motion vector and a previous reconstructed image. The plurality of resolutions may include an original resolution of the current image and a resolution downscaled from the original resolution of the current image.

According to an embodiment of the disclosure, the image decoding method based on AI may further include obtaining feature data of a current residual image from the bitstream, obtaining the current residual image by applying the feature data of the current residual image to a residual decoder; and obtaining a current reconstructed image by using the current predicted image and the current residual image.

According to an embodiment of the disclosure, the motion vector decoder may include a plurality of first decoding neural network layers, each of the first decoding neural network layers may include a first decoding layer and a second decoding layer in parallel, the first decoding layer may include a first up-convolutional layer, and the second decoding layer may include a second up-convolutional layer and a first operation layer for multiplying an input by an upscaling ratio corresponding to a downscaling ratio.

According to an embodiment of the disclosure, the motion vector decoder may include a plurality of second decoding neural network layers, each of the second decoding neural network layers may include a third decoding layer and a fourth decoding layer in parallel, the third decoding layer may include a first convolutional layer and a first upsampling layer, and the fourth decoding layer may include a second convolutional layer and a first operation layer for multiplying an input by an upscaling ratio corresponding to a downscaling ratio.

According to an embodiment of the disclosure, the motion vector decoder may include a plurality of third decoding neural network layers, and each of the third decoding neural network layers may include a first inverse operation layer for dilated convolution, a second inverse operation layer for dilated convolution, and a third inverse operation layer for dilated convolution in parallel.

According to an embodiment of the disclosure, the current image may be feature data output by applying pixel data of the current image to a convolutional neural network, and the previous reconstructed image may be feature data output by applying pixel data of the previous reconstructed image to a convolutional neural network.

According to an embodiment of the disclosure, the current image may be the pixel data of the current image, and the previous reconstructed image may be the pixel data of the previous reconstructed image.

The image decoding method based on AI according to an embodiment of the disclosure obtains the motion vector feature data for the current image of a plurality of resolutions from the bitstream and obtains a current motion vector by applying the motion vector feature data to a motion vector decoder, and thus is effective in estimating not only a motion vector of a small size but also a motion of a large size by applying a extended effective receptive field. Because the motion vector feature data for the current image of a plurality of resolutions obtained from the bitstream is a feature map of a small size output from a final layer and also a feature map for all scales, the image decoding method is efficient for encoding feature data of a plurality of scales in terms of data compression, and is suitable for video coding.

An image encoding apparatus based on AI may include the prediction encoder 1310 configured to obtain motion vector feature data of a current image of a plurality of resolutions by applying the current image and a previous reconstructed image to a motion vector encoder; the prediction decoder 1340 configured to obtain a current motion vector by applying the motion vector feature data to a motion vector decoder and obtain a current predicted image by using the current motion vector and a previous reconstructed image; and the generator 1320 configured to generate a bitstream including the motion vector feature data. The plurality of resolutions may include an original resolution of the current image and a resolution downscaled from the original resolution of the current image.

According to an embodiment of the disclosure, the prediction decoder 1340 may obtain a current residual image corresponding to a difference between the current predicted image and the current image. The prediction decoder 1340 may obtain feature data of the current residual image by applying the current residual image to a residual encoder. The generator 1320 may generate a bitstream further including the feature data of the current residual image.

According to an embodiment of the disclosure, the motion vector decoder may include a plurality of first decoding neural network layers, each of the plurality of first decoding neural network layers may include a first decoding layer and a second decoding layer in parallel, the first decoding layer may include a first up-convolutional layer, the second decoding layer may include a second up-convolutional layer and a first multiplication layer that multiplies an input by an upscaling ratio corresponding to a downscaling ratio, the motion vector encoder may include a plurality of first encoding neural network layers, each of the plurality of first encoding neural network layers may include a first encoding layer and a second encoding layer in parallel, the first encoding layer may include a first convolutional layer, and the second encoding layer may include a pooling layer and a second convolutional layer.

According to an embodiment of the disclosure, the motion vector decoder may include a plurality of second decoding neural network layers, each of the plurality of second decoding neural network layers may include a third decoding layer and a fourth decoding layer in parallel, the third decoding layer may include a first convolutional layer and a first upsampling layer, the fourth decoding layer may include a second upsampling layer, a second convolutional layer, and a first multiplication layer that multiplies an input by an upscaling ratio corresponding to a downscaling ratio, the motion vector encoder may include a plurality of second encoding neural network layers, each of the plurality of second encoding neural network layers may include a third encoding layer and a fourth encoding layer in parallel, the third encoding layer may include a third convolutional layer and a first pooling layer, and the fourth encoding layer may include a second pooling layer and a fourth convolutional layer.

According to an embodiment of the disclosure, the motion vector decoder may include a plurality of third decoding neural network layers, each of the plurality of third decoding neural network layers may include a first inverse operation layer for dilated convolution, a second inverse operation layer for dilated convolution, and a third inverse operation layer for dilated convolution in parallel, the motion vector decoder may include a plurality of third encoding neural network layers, and each of the plurality of third encoding neural network layers may include a first dilated convolutional layer, a second dilated convolutional layer, and a third dilated convolutional layer in parallel.

According to an embodiment of the disclosure, the current image may be feature data output by applying pixel data of the current image to a convolutional neural network, and the previous reconstructed image may be feature data output by applying pixel data of the previous reconstructed image to a convolutional neural network.

According to an embodiment of the disclosure, the current image may be the pixel data of the current image, and the previous reconstructed image may be the pixel data of the previous reconstructed image.

The image encoding apparatus based on AI according to an embodiment of the disclosure obtains the motion vector feature data for the current image of a plurality of resolutions by using a motion vector encoder having a neural network structure including a neural network layer for maintaining the resolution of an input image and a neural network layer for downscaling the resolution of the input image, and obtains a current motion vector by applying the motion vector feature data to a motion vector decoder, and thus is effective in estimating not only a motion vector of a small size but also a motion of a large size by applying a extended effective receptive field. Because the motion vector feature data for the current image of a plurality of resolutions obtained from the motion vector encoder is a feature map of a small size output from a final layer and also a feature map for all scales, the image encoding apparatus is efficient for encoding feature data of a plurality of scales in terms of data compression, and is suitable for video coding.

An image decoding apparatus based on AI according to an embodiment of the disclosure may include the obtainer 1510 configured to obtain motion vector feature data of a current image of a plurality of resolutions from a bitstream, and the prediction decoder 1520 configured to obtain a current motion vector by applying the motion vector feature data to a motion vector decoder and obtain a current predicted image by using the current motion vector and a previous reconstructed image. The plurality of resolutions may include an original resolution of the current image and a resolution downscaled from the original resolution of the current image.

According to an embodiment of the disclosure, the obtainer 1510 may obtain feature data of the current residual image from the bitstream. The prediction decoder 1520 may obtain the current residual image by applying the feature data of the current residual image to a residual decoder. The prediction decoder 1520 may obtain a current reconstructed image by using the current predicted image and the current residual image.

According to an embodiment of the disclosure, the motion vector decoder may include a plurality of first decoding neural network layers, each of the decoding layer in parallel, the first decoding layer may include a first up-convolutional layer, and the second decoding layer may include a second up-convolutional layer and a first operation layer for multiplying an input by an upscaling ratio corresponding to a downscaling ratio.

According to an embodiment of the disclosure, the motion vector decoder may include a plurality of second decoding neural network layers, each of the second decoding neural network layers may include a third decoding layer and a fourth decoding layer in parallel, the third decoding layer may include a first convolutional layer and a first upsampling layer, and the fourth decoding layer may include a second convolutional layer and a first operation layer for multiplying an input by an upscaling ratio corresponding to a downscaling ratio.

According to an embodiment of the disclosure, the motion vector decoder may include a plurality of third decoding neural network layers, and each of the third decoding neural network layers may include a first inverse operation layer for dilated convolution, a second inverse operation layer for dilated convolution, and a third inverse operation layer for dilated convolution in parallel.

According to an embodiment of the disclosure, the current image may be feature data output by applying pixel data of the current image to a convolutional neural network, and the previous reconstructed image may be feature data output by applying pixel data of the previous reconstructed image to a convolutional neural network.

According to an embodiment of the disclosure, the current image may be the pixel data of the current image, and the previous reconstructed image may be the pixel data of the previous reconstructed image.

The image decoding apparatus based on AI according to an embodiment of the disclosure obtains the motion vector feature data for the current image of a plurality of resolutions from the bitstream and obtains a current motion vector by applying the motion vector feature data to a motion vector decoder, and thus is effective in estimating not only a motion vector of a small size but also a motion of a large size by applying a extended effective receptive field. Because the motion vector feature data for the current image of a plurality of resolutions obtained from the bitstream is a feature map of a small size output from a final layer and also a feature map for all scales, the image decoding apparatus is efficient for encoding feature data of a plurality of scales in terms of data compression, and is suitable for video coding.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

What is claimed is:

1. An image encoding method based on artificial intelligence (AI), the image encoding method comprising:

obtaining motion vector feature data of a current frame by inputting the current frame and a reference frame to a motion vector encoder, wherein the motion vector encoder comprises a plurality of neural network layers, wherein each of the plurality of neural network layers comprises a plurality of encoding layers which operate in parallel, wherein the plurality of encoding layers comprise a first encoding layer to generate a first feature map corresponding to an original resolution of the current frame; and a second encoding layer to generate a second feature map corresponding to a resolution downscaled from the original resolution of the current frame, wherein the motion vector encoder is configured to generate intermediate feature maps comprising the first feature map and the second feature map, output from neural network layers within the motion vector encoder, at a plurality of resolution scales comprising the original resolution of the current frame and at least one resolution downscaled from the original resolution of the current frame, and to concatenate the intermediate feature maps at the plurality of resolution scales within the motion vector encoder to generate the motion vector feature data representing motion information of the current frame at different resolution scales, wherein the motion vector feature data comprises a latent representation representing motion information of the current frame at the plurality of resolution scales;

obtaining a current motion vector by inputting the motion vector feature data to a motion vector decoder;

obtaining a current predicted image based on the current motion vector and the reference frame; and generating a bitstream based on the motion vector feature data and the current predicted image.

2. The image encoding method of claim 1, wherein the reference frame is a previously reconstructed image.

3. The image encoding method of claim 1, the plurality of resolution scales comprises a first resolution scale for maintaining the original resolution of the current frame, and a second resolution scale for downscaling the original resolution of the current frame.

4. The image encoding method of claim 1, further comprising:

obtaining a current residual image corresponding to a difference between the current predicted image and the current frame; and obtaining feature data of the current residual image by applying the current residual image to a residual encoder, wherein the bitstream further comprises feature data of the current residual image.

5. The image encoding method of claim 1, wherein the motion vector decoder comprises a plurality of first decoding neural network layers, each of the plurality of first decoding neural network layers comprises a first decoding layer and a second decoding layer which operate in parallel, the first decoding layer comprises a first up-convolutional layer, the second decoding layer comprises a second up-convolutional layer and a first multiplication layer that multiplies an input by an upscaling ratio corresponding to a downscaling ratio, the first encoding layer comprises a first convolutional layer, and the second encoding layer comprises a pooling layer and a second convolutional layer.

6. The image encoding method of claim 1, wherein the motion vector decoder comprises a plurality of second decoding neural network layers, each of the plurality of second decoding neural network layers comprises a first decoding layer and a second decoding layer which operate in parallel, the first decoding layer comprises a first convolutional layer and a first upsampling layer, the second decoding layer comprises a second upsampling layer, a second convolutional layer, and a first multiplication layer that multiplies an input by an upscaling ratio corresponding to a downscaling ratio, the first encoding layer comprises a third convolutional layer and a first pooling layer, and the second encoding layer comprises a second pooling layer and a fourth convolutional layer.

7. The image encoding method of claim 1, wherein the motion vector decoder comprises a plurality of third decoding neural network layers, each of the plurality of third decoding neural network layers comprises a first inverse operation layer for dilated convolution, a second inverse operation layer for dilated convolution, and a third inverse operation layer for dilated convolution which operate in parallel, the plurality of encoding layers further comprises a third encoding layer to generate a third feature map corresponding to a second resolution downscaled from the original resolution of the current frame, wherein the second resolution of the third feature map is different from the resolution of the second feature map, wherein each of the plurality of encoding layers comprises a dilated convolution layer.

8. The image encoding method of claim 1, wherein the current frame comprises feature data output by applying pixel data of the current frame to a convolutional neural network, and the reference frame comprises feature data output by applying pixel data of the reference frame to the convolutional neural network.

9. The image encoding method of claim 1, wherein the current frame comprises pixel data of the current frame, and the reference frame comprises pixel data of the reference frame.

10. An image decoding method based on artificial intelligence (AI), the image decoding method comprising:

obtaining motion vector feature data of a current frame from a bitstream, wherein the motion vector feature data generated by a motion vector encoder, wherein the motion vector encoder comprises a plurality of neural network layers, wherein each of the plurality of neural network layers comprises a plurality of encoding layers which operate in parallel, wherein the plurality of encoding layers comprises a first encoding layer to generate a first feature map corresponding to an original resolution of the current frame; and a second encoding layer to generate a second feature map corresponding to a resolution downscaled from the original resolution of the current frame, wherein the motion vector encoder is configured to generate intermediate feature maps comprising the first feature map and the second feature map, output from neural network layers within the motion vector encoder, at a plurality of resolution scales comprising the original resolution of the current frame and at least one resolution downscaled from the original resolution of the current frame, and to concatenate the intermediate feature maps at the plurality of resolution scales within the motion vector encoder to generate the motion vector feature data representing motion information of the current frame at different resolution scales, wherein the motion vector feature data comprises a latent representation representing motion information of the current frame at the plurality of resolution scales;

obtaining a current motion vector by applying the motion vector feature data to a motion vector decoder; and obtaining a current predicted image by using the current motion vector and a reference frame.

11. The image decoding method of claim 10, further comprising:

obtaining feature data of a current residual image from the bitstream;

obtaining the current residual image by applying the feature data of the current residual image to a residual decoder;

obtaining a current reconstructed image by using the current predicted image and the current residual image.

12. The image decoding method of claim 10, wherein the motion vector decoder comprises a plurality of first decoding neural network layers, each of the plurality of first decoding neural network layers comprises a first decoding layer and a second decoding layer which operate in parallel, the first decoding layer comprises a first up-convolutional layer, and the second decoding layer comprises a second up-convolutional layer and a first operation layer that multiplies an input by an upscaling ratio corresponding to a downscaling ratio.

13. The image decoding method of claim 10, wherein the motion vector decoder comprises a plurality of second decoding neural network layers, each of the plurality of second decoding neural network layers comprises a first decoding layer and a second decoding layer which operate in parallel, the first decoding layer comprises a first convolutional layer and a first upsampling layer, and the second decoding layer comprises a second upsampling layer, a second convolutional layer, and a first operation layer that multiplies an input by an upscaling ratio corresponding to a downscaling ratio.

14. The image decoding method of claim 10, wherein the motion vector decoder comprises a plurality of third decoding neural network layers, and each of the plurality of third decoding neural network layers comprises a first inverse operation layer for dilated convolution, a second inverse operation layer for dilated convolution, and a third inverse operation layer for dilated convolution which operate in parallel.

15. An image encoding apparatus based on artificial intelligence (AI), the image encoding apparatus comprising:

at least one processor; and a memory storing instructions that, when executed by the at least one processor, cause the at least one processor to:

obtain motion vector feature data of a current frame by inputting the current frame and a reference frame to a motion vector encoder, wherein the motion vector encoder comprises a plurality of neural network layers, wherein each of the plurality of neural network layers comprises a plurality of encoding layers which operate in parallel, wherein the plurality of encoding layers comprises a first encoding layer to generate a first feature map corresponding to an original resolution of the current frame; and a second encoding layer to generate a second feature map corresponding to a resolution downscaled from the original resolution of the current frame, wherein the motion vector encoder is configured to generate intermediate feature maps comprising the first feature map and the second feature map, output from neural network layers within the motion vector encoder, at a plurality of resolution scales comprising the original resolution of the current frame and at least one resolution downscaled from the original resolution of the current frame, and to concatenate the intermediate feature maps at the plurality of resolution scales within the motion vector encoder to generate the motion vector feature data representing motion information of the current frame at different resolution scales, wherein the motion vector feature data comprises a latent representation representing motion information of the current frame at the plurality of resolution scales, obtain a current motion vector by inputting the motion vector feature data to a motion vector decoder, obtain a current predicted image based on the current motion vector and the reference frame, and generate a bitstream based on the motion vector feature data and the current predicted image.

* * * * *